United States Patent [19]

Miyauchi et al.

[11] Patent Number: 4,616,766
[45] Date of Patent: Oct. 14, 1986

[54] CAN-LIKE CONTAINER

[75] Inventors: Otohiko Miyauchi; Michihiro Ohkawachi; Junji Yotsuyanagi, all of Kanagawa, Japan

[73] Assignee: Showa Denko Kabushiki Kaisha, Tokyo, Japan

[21] Appl. No.: 661,747

[22] Filed: Oct. 17, 1984

[30] Foreign Application Priority Data

Oct. 17, 1983 [JP] Japan .................................. 58-192452
Oct. 18, 1983 [JP] Japan .................................. 58-193439

[51] Int. Cl.⁴ .............................................. B65D 1/34
[52] U.S. Cl. ................................ 220/450; 229/3.5 MF
[58] Field of Search ................. 220/450; 229/3.5 MF, 229/5.5

[56] References Cited

U.S. PATENT DOCUMENTS 3,038,634  6/1962  Cheeley ...................... 229/3.5 MF
3,298,559  1/1967  Lurie ............................... 220/450
3,558,036  1/1971  DeVoe ................... 229/3.5 MF X
3,885,730  5/1975  Christensson .......... 229/3.5 MF X
4,267,937  5/1981  Piltz et al. ..................... 215/256 X
4,278,716  7/1981  Buchner et al. ............... 220/450 X
4,333,601  6/1982  Grimm ........................... 220/450 X Primary Examiner—Steven M. Pollard
Attorney, Agent, or Firm—Sughrue, Mion, Zinn, Macpeak & Seas

[57] ABSTRACT

A can-like container and a method for manufacturing such a container which provides a strong structure, tight gas barrier, and no effect upon the taste of food stored in the container. The body of the container is fabricated with a multi-layer sheet composed of a metal foil layer having a thickness of no more than 40 μm and a hot-melt resin layer formed on one or both sides of the metal foil layer. The margin portions of the multi-layer material of the container body in corners thereof are either folded into two tucks at each corner or formed into vertical wrinkles upon molding the container body. A cover is joined to the container body, which cover is also composed of a metal foil layer and at least hot-melt resin layer.

18 Claims, 47 Drawing Figures

CAN-LIKE CONTAINER

BACKGROUND OF THE INVENTION

The present invention relates to an injection molding method and to an injection molding metal mold assembly used in such a method. More particularly, the invention relates to an insert molding method in which an injection molding machine is used to inject molding material into an insert of, for instance, aluminum foil to manufacture a molding in which the insert is integral with the molding material, and also to a metal mold assembly used in the method.

In an insert molding method of this type, insertion accuracy of the insert and the molding material is essential. For insertion by injection molding, the insert is inserted into the metal mold assembly in advance. However, this method suffers from a problem in that the insert can easily be displaced during molding, and the accuracy of the resultant molding is hence often lower than required.

Examples of the conventional method in which an insert is inserted into a metal mold assembly in advance and molding material is injected to the insert to form an insert molding are a method in which an insert plate is set along the configuration of the core mold of the metal mold assembly, a method of which an insert plate is set in the metal mold by inserting the positioning pin of the metal mold into a hole in the insert plate, and a method in which a film plate is held by a holding mold provided for the cavity mold so that the plate is automatically cut and pushed into the cavity (see Japanese Laid-Open Patent Application No. 5747/1981). However, in these conventional methods, the positioning accuracy of the insert is low, and the insert is not satisfactorily held. Thus, it is difficult to obtain moldings high in insertion accuracy utilizing these conventional methods.

Furthermore, the conventional methods are different from an injection molding method in which, according to the invention, displacement of the insert during the molding operation is prevented to obtain a molding high in insertion accuracy and which has a fold as the bottom or cover (top) of a can-like container.

A can-like container to which the invention relates and its bottom and cover (top) will be described.

FIG. 1 is a perspective view showing a can-like container having a side wall 1, a bottom 2 and a rectangular cover 3.

FIG. 2 is also a perspective view showing a can-like container having a side wall 4, a bottom 5 and a round cover 6.

FIG. 3 is a sectional view of the bottom 2 which is to be joined to the side wall 1. In FIG. 3, reference 7 designates a base material such as metal foil or sheet which air, water, etc. cannot permeate (hereinafter referred to a "a gas barrier type base material" when applicable). Examples of the base 7 are alumium foil, and sheets of saponifed ethylene vinyl acetate copyolymer, polyvinylidene chloride and polyamide. Typically, the aluminum foil is used. A resin layer (not sown in FIG. 3) which can be made molten by heating is formed on one or both sides of the gas barrier type base material.

The molding shown in FIG. 3 is manufactured by inserting the gas barrier type base material or a base material having a thermally meltable resin layer into a metal mold where molten molding material is injected into the base material (or at insert) by an injection molding machine. In FIG. 3, reference numeral 8 designates a synthetic resin layer which is formed by injection. The molding in FIG. 3 must have a fold 9 to join it to the side wall 1.

FIG. 4 is a longitudinal sectional view of the rectangular cover 3 (FIG. 1) which is to be joined to the side wall 1. In FIG. 4, reference numeral 10 designates a base material. In the case of FIG. 4, the base material 10 is obtained by forming thermally meltable resin layers 12 and 13 and both sides of a metal foil 11. In FIG. 4, reference numeral 14 designates a synthetic resin layer. The molding in FIG. 4 can be obtained by injection synthetic resin molding material into the base material (insert) 10, similar to the case of the bottom shown in FIG. 3. In FIG. 4, reference numeral 15 designates a handle (a so-called "pull top") on the cover. When the handle 15 is lifted with a finger tip inserted into a groove 16, the base material 10 is torn below the position 17 so that the cover 3 is pulled off. Further in FIG. 4, reference numeral 18 designates a treatment layer to facilitate the peeling of the handle portion from the base material 10. The molding in FIG. 4 has a fold 19 similar to the case of the molding in FIG. 3.

FIG. 5 is a longitudinal sectional view of the round cover 6 shown in FIG. 2. The round cover 6 is manufactured in the same manner as the molding in FIG. 4. In FIG. 5, components similar to those in FIG. 4 are designated by the same reference numerals and their descriptions are omitted. The molding in FIG. 5 also has a fold 19.

In the injection molding of a flat part which, unlike the moldings in FIGS. 3, 4 and 5, has no fold (9 or 19), for instance, in the case of injecting molding material into a round insert, a slight displacement thereof causes no trouble. On the other hand, if, in the case of a molding with a fold (which the invention concerns), the insert is displaced even slightly during molding, undesirable results occur. It is impossible to obtain a molding high in insertion accuracy.

Further in a conventional method of adhering a multi-layer sheet to its outer synthetic resin layer to improve the gas barrier characteristics, after the outer synthetic resin layer is formed by injection molding or the like, an adhesive is used to cause the multi-layer sheet to adhere thereto.

This conventional method suffers from the following problems: (1) the number of manufacturing steps is high and the manufacturing cost high, (2) the adhesive must be hygenic, and (3) the synthetic resin layer may peel off the multi-layer sheet if repeatedly heated and cooled.

It is desirable to make the outer resin layer integral with the multi-layer sheet, for instance, by insert injection molding which prevents the permeation of moisture and oxygen and the transmission of light to improve the gas barrier characteristics, thereby to provide a can-like container's cover in which the outer resin layer is strongly joined with the multi-layer sheet. However, when the outer resin layer is joined with the multi-layer sheet, the handle (or "pull top") of the cover is also joined with the multi-layer sheet, with the result that it is impossible to peel the handle off the multi-layer sheet or the body of the cover.

Further, in order to improve the openability of the opening part, a slot or groove is, in general, formed in the cover so that the opening part is opened along the slot. However, the formation of the slot unavoidably lowers the moldability. In order to overcome this difficulty, in the formation of the resin sheet according to the aforementioned method in which the resin sheet is bonded to the aluminum foil, the slot is divided into a plurality of parts, i.e., instead of one slot, a plurality of slots connected through bridges are formed to permit the smooth flowing of the molding material to maintain the moldability (see Japanese Laid-Open Patent Application No. 39489/1977).

The method is advantageous in that the moldability is improved; however, it is obvious that the openability is lowered by the bridges.

The present invention further relates to a container made of a multi-layer sheet in which plural plastic coating layers are formed on an aluminum base foil layer. Particularly, the invention relates to such a container which can be used for storing food for long periods of time and in which the food stored in the container is kept out of contact with the metal of the base layer.

Metal cans suffer from various problems, including an adverse effect on the taste of the food contained therein and numerous difficulties in fabricating such cans. With the view of providing a container which is free of such defects, it has been proposed to fabricate a container from a multi-layer sheet composed of an aluminum foil base and multiple plastic layers formed on both sides of the base layer.

To form a three-dimensional container from such a flat multi-layer sheet, a method has been known whereby the peripheral edges of the multi-layer sheet are clamped in a jig and a downward pressure is applied to the sheet. This operation is generally effected with a cold press roll. According to this process, however, since the multi-layer sheet is unavoidably stretched, the aluminum foil base layer has an uneven thickness, and pin holes or cracks are likely to occur therein. Accordingly, it is necessary to employ a relatively thick foil of 60 to 100 μm, and accordingly, the production costs of the container are high. Moreover, because the process includes stretching of the aluminum foil, it is difficult to fabricate a deep container.

In another approach for producing a three-dimensional container such as a rectangular container from a flat multi-layer sheet, the sheet is first notched (cut away) in suitable portions, and then the flaps thus formed are folded inwardly. According to this process, however, the cut sections contact the contents of the container, making the container not suitable for food storage.

SUMMARY OF THE INVENTION

Accordingly, an object of the present invention is to provide a can-like container which is free from the above-mentioned drawbacks.

More specifically, it is an object of the present invention to provide such a can-like container employing a multi-layer sheet as a starting material which has a thin aluminum foil base.

Yet more specifically, it is an object of the present invention to provide such a container in which the multi-layer sheet is formed into the container without the aluminum foil base layer thereof cracking or incurring pinhole defects.

Still further, it is an object of the present invention to provide such a container in which there is no effect on the taste of the food contained therein.

Still another object of the present invention is to provide such a can-like container having a container body formed of a multi-layer sheet which is joined to a cover using a hot-melt resin process, thereby providing an excellent barrier against the infusion of gas and hence to provide for a long storage period of food held in the container.

A still further object of the present invention is to provide such a can-like container which uses a metal foil for its base which is sufficiently thin that the container can be easily incinerated, thereby to make disposal of the can easier than for prior art cans.

A yet further object of the present invention is to provide such a container which is prevented from being deformed or crushed during transportation or stacking so that the sealing property of the container is significantly improved.

In accordance with the above and other objects of the invention, the present invention provides a can-like container fabricated from a multi-layer sheet composed of a thin metal foil base and a resin layer and having a uniform thickness. More specifically, the body of the container is made of a multi-layer sheet composed of a metal foil base layer having a thickness of 40 μm or less and a hot-melt resin layer on one or both sides of the metal foil base layer, and a cover composed of at least two layers including a metal foil layer and a hot-melt resin layer formed on at least one side of its base layer. The container body is molded in such a way that the corner portions are formed by making three-layer folds therein or by gathering the sheet material in the corner portions into vertical wrinkles.

DESCRIPTION OF THE PREFERRED EMBODIMENTS

Figure 1:
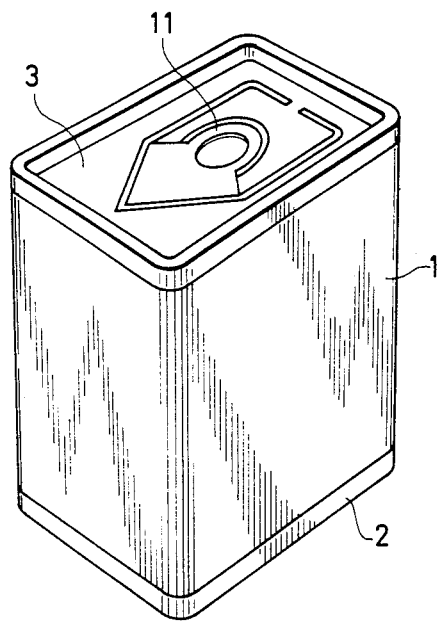
FIG. 1 is a perspective view showing a can-like container with a rectangular cover to which this invention relates.

A molding method of the invention will be described with reference to the case where a stripper plate is used as a guide member as shown in the drawings.

A stripper plate is generally used to eject and remove a molding from the metal mold in the injection molding machine. The applicant has developed a novel injection molding method in which an insert is inserted and fixedly held in the stopper plate to improve the insertion accuracy and to prevent the displacement of the insert. Accordingly, the method of the invention is suitable for providing an insert molding having a fold supported by the insert.

The invention will now be described in more detail with reference to the accompanying drawings.

Figure 6:
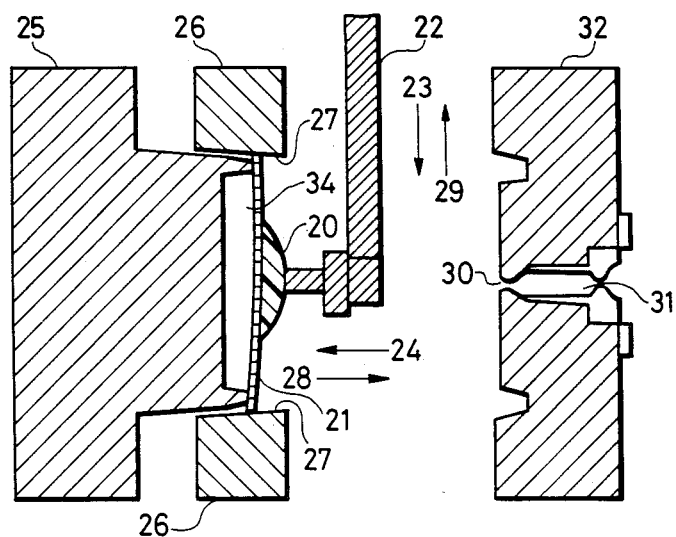
FIG. 6 is a sectional view for a description of an insert inserting step.

FIG. 6 illustrates a method of inserting an insert into a metal mold. In this embodiment, a robot (not shown) is used to insert the insert into the metal mold. An insert 21 is sucked and retained by a suction plate 20 which is connected to the arm of the robot. Under this condition, the movable cylinder 22 of the robot is moved downwardly in the direction of the arrow 23 and then moved sideways in the direction of the arrow 24 so that the insert 21 is inserted into a stripper plate 26 provided for a metal mold (core type). Even if, in this operation, the robot moves the insert 21 obliquely with respect to the inner surface of the metal mold, the insert 21 will still be suitably inserted into the metal mold because it is guided by the inner wall 27 of the stripper plate 26. That is, the insert 21 is smoothly guided by the stripper plate 26 at all times.

The insert is generally larger than the hold cut in the stripper palte 26. Therefore, the insert 21 is retained and positioned by the stripper plate 26 when inserted; that is, it is fixedly held in the stripper plate 26 when inserted. In FIGS. 6 and 7 through 11, the insert is shown oriented in a vertical direction by the stripper plate and fixedly held therein. However, it should be noted that the insert is retained on four sides.

After the insert has been fixedly held in the stripper plate, the movable cylinder 22 of the robot is moved in the direction of the arrow 28 and then lifted in the direction of the arrow 29.

Figure 7:
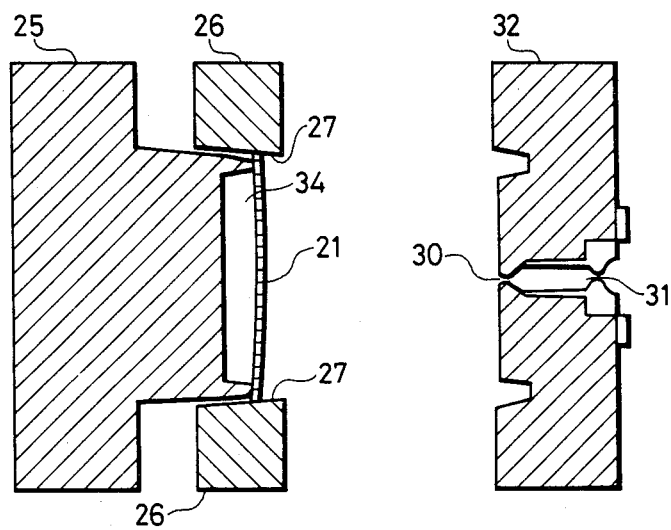
FIG. 7 is a sectional view for a description of the start of a mold closing operation.

FIG. 7 shows the insert fixedly held in the stripper plate 26 with the robot's cylinder having been lifted away. Under this condition, the metal mold (core-type, movable) 25 is moved laterally to start a mold closing step with a metal mold (cavity-type, stationary) 32 having an injection nose 30 and a molding material supplying path 31 communicated with the gate 30 at the center. In the closing step, the insert 21 cannot be displaced because it is fixedly held by the stripper 26.

Figure 8:
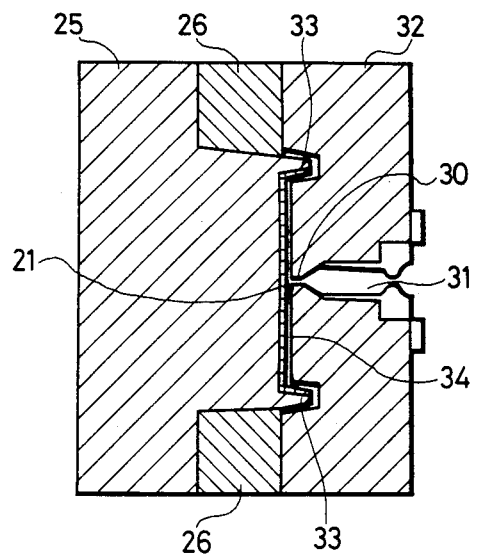
FIG. 8 is a sectional view for a description of a molding material injecting step which is carried out after the mold closing operation.

As shown in FIG. 8, at the end of the closing step, the peripheral portion of the insert 21 is formed into a fold 33, and molten molding material is injected through the injection port 30 into a cavity 34 which is formed by the core-type metal mold 25 and the cavity-type metal mold 30. The molding has a fold similar to the moldings shown in FIGS. 3 through 5. In the above-described operation, the insert is not displaced at all. Therefore, the molding has a high insertion accuracy, and the molding material is applied to the fold also with a high accuracy.

After molding material injection, pressurizing, cooling, mold opening, mold ejecting and mold removing, steps may be carried out according to the ordinary injection molding cycle to obtain the molding. However, according to the invention, the insert is inserted and fixedly held by means of the stripper plate, and the molding is ejected and removed with the aid of the stripper plate, so that the injection molding is achieved more efficiently.

In the above-described embodiment, the insert is inserted into the stripper plate and fixedly held therein. However, the guide member in the invention may be any one which has the above-described functions and can achieve the objects of the invention.

Figure 9:
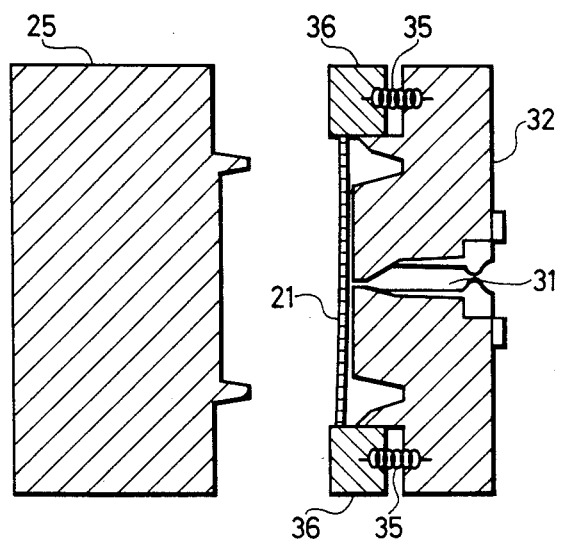
FIG. 9 is a sectional view of a metal mold assembly using a guide member different from the one in FIGS. 6, 7 and 8.
Figure 10:
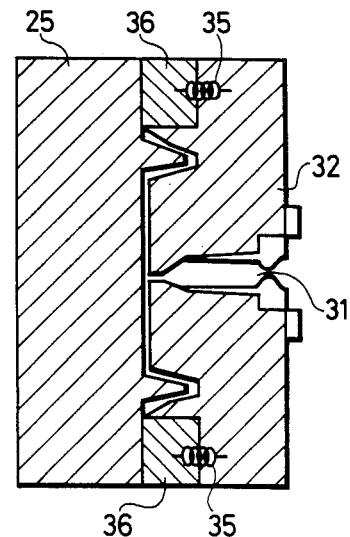
FIG. 10 is a sectional view for a description of a molding material injecting step which is carried out after the meal mold assembly (FIG. 9) has been closed.

FIG. 9 illustrates another embodiment of the invention. In this embodiment, a guide member 36 is connected through springs 35 to the upper and lower portions of a stationary metal mold 32. An insert 21 is inserted into the guide member 36 and fixedly held therein. Under this condition, a mold closing operation is carried out as shown in FIG. 10, and then an injection molding operation is performed as described with reference to FIGS. 6, 7 and 8. In FIG. 10, the insert 21 (FIG. 9) is not shown.

Figure 11:
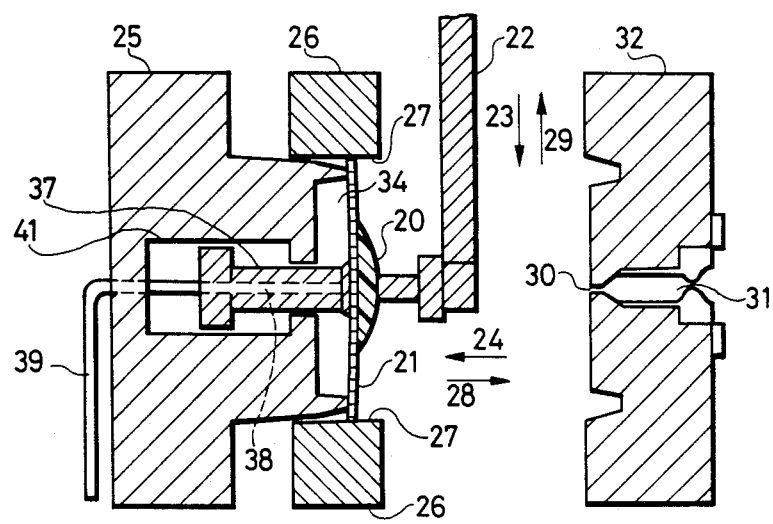
FIG. 11 is a sectional view used for a description of the insert inserting operation which utilizes a suction device.

FIG. 11 depicts a third embodiment of the invention. In this embodiment, the insert inserted in the guide member is more positively fixed therein by means of suction device such as a vacuum cylinder provided in the metal mold. This method is advantageously applicable to a case where molding should be carried out at higher speed or a case where a large number of moldings should be manufactured. In these cases, the method can more positively prevent the displacement of the insert and thus more completely contribute to improving the insertion accuracy. Furthermore, according to this method, the injection molding is carried out with the insert sucked and retained by the vacuum cylinder, and therefore deformation of the insert is positively prevented.

The third embodiment will be described further with reference to FIGS. 11, 12 and 13. As shown in FIG. 11, an insert 21 is sucked and retained by the suction plate (or suction disc) 20 of a robot. Under this condition, the movable cylinder 22 of the robot is moved downwardly in the direction of the arrow 23 and is then moved in the direction of the arrow 24. As a result, the insert 21 is inserted into a guide member 26 provided for a metal mold 25 while being guided by the guide member 26, and is fixedly held (positioned) therein. Thus, the displacement of the insert is prevented. In this operation, the insert 21 is more firmly held therein because it is held by a vacuum cylinder 37 provided in the metal mold 25. The vacuum cylinder 37 has a through-hole 38 which is connected through a pipe 39 to a vacuum pump (not shown) so that the insert 21 is thereby attracted towards the metal mold 25. The robot's movable cylinder 22 is moved in the direction of the arrow 28 and is then lifted in the direction of the arrow 29 before the mold closing operation is carried out.

Figure 12:
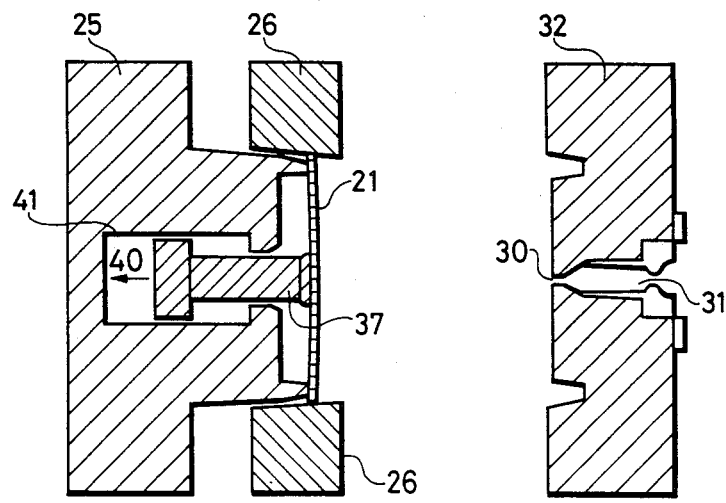
FIG. 12 is a sectional view for a description of the start of the closing operation of the metal molds in FIG. 11.
Figure 13:
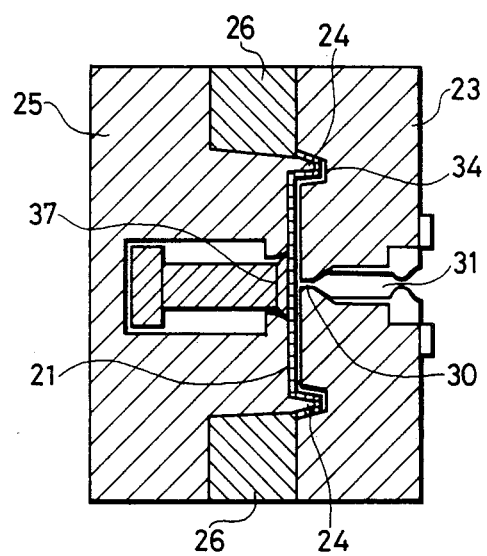
FIG. 13 is a sectional view used for a description of the molding material injecting operation which is carried out after the mold closing operation.

FIG. 12 shows the start of the mold closing operation, and FIG. 13 the end of the mold closing operation. In the mold closing operation, the vacuum cylinder 37 is slide in a cylinder housing 41 in the direction of the arrow 40 as shown in FIG. 12; that is, the vacuum cylinder 37 moves into the metal mold 25 as shown in FIG. 13. In FIGS. 12 and 13, the through-hole 38 is not shown.

Upon completion of the mold closing operation, molding material is injected through the molding material supplying path 31 and the injection gate 30 of the metal mold 32 into the cavity 34 which is formed by the metal molds. The other steps are the same as those in the above-described embodiment.

In the above-described embodiments, the insert is larger than the hold of the guide member. However, in a case where the insert is smaller than the hold of the guide member, the insert can be fixedly held by employing at least one rib extending from the inner periphery of the guide member.

Figure 14:
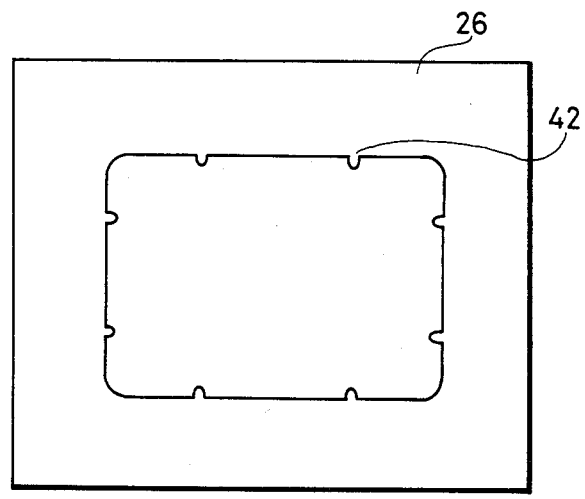
FIG. 14 is a plan view for a description of another embodiment of the invention.
Figure 15:
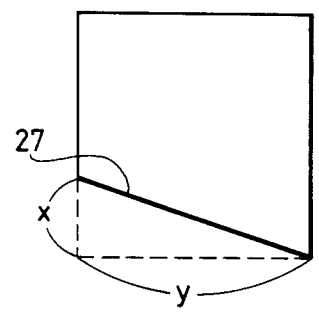
FIG. 15 is a sectional view used for a description of another embodiment of the invention.

FIG. 14 is a front view of a stripper plate 26 with ribs 42. The angle (draft) of the inner wall 27 of the guide member 26, which is brought into contact with the insert 21, may be suitably controlled. This will be described with reference to FIG. 15 which is an enlarged side view of the guide member 26. In FIG. 15, the angle (x/y) is adjusted so that a large insert can be smoothly inserted into the guide member and fixedly held therein.

In order to clarify the effects of the invention, examples thereof will be described.

EXAMPLE 1

The bottom of a can-like container was molded by using an injection molding machine IS-50A(30Z) manufactured by Toshiba Co. of Japan.

The insert was fabricated by forming resin layers of ethylene proplene block copolymer (MFR 1.1 g/10 min, ethylene content 9 wt%) of both sides of an aluminum layer. The thicknesses of the (outer) resin layer, the aluminum layer and hte (inner) resin layer were 30 microns, 15 microns and 70 microns, respectively. The insert was inserted into the stripper plate of the injection molding machine and fixedly held therein by means of the robot. After the mold closing operation, propylene ethylene block copolymer of MFR 10.0 g/10 min was injected into the mold cavity. The molding conditions were as follows:

Cylinder temperature—260° C.
Injection pressure:
  Primary pressure—60 kg/cm2
  Secondary pressure—40 kg/cm2
Injection time—3 seconds
Cooling time—8 seconds
Molding cycle (total)—15 seconds
Injected resin thickness—0.7 mm The insertion accuracy of the base material (insert) and the injected resin layer of the can-like container was 0.3 to 0.5 mm in the longitudinal direction and 0.3 to 0.5 mm in the lateral direction.

EXAMPLE 2

Figure 4:
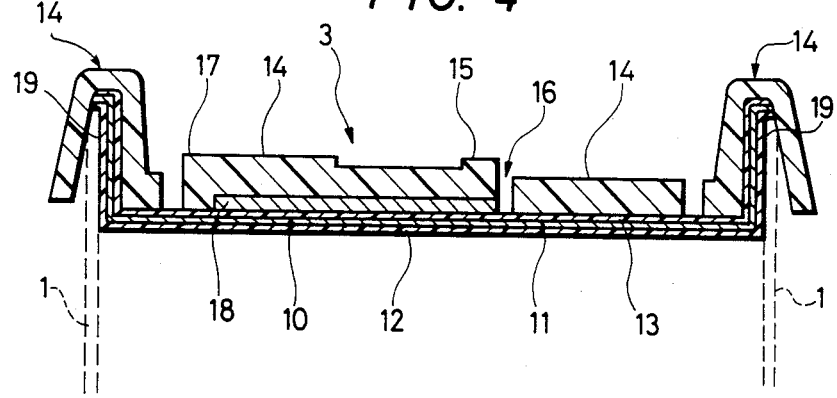
FIG. 4 is a sectional view of the angular cover.

The rectangular cover shown in FIGS. 1 and 4 was made in the same manner as in Example 1 with the exception that, instead of the proplyene ethylene block copolymer of MFR 10.0 g/10 min, a material prepared by adding calcium carbide 40% to that resin material was used.

The insertion accuracy of the retangular cover thus constructed was similar to that of Example 1.

EXAMPLE 3

Figure 2:
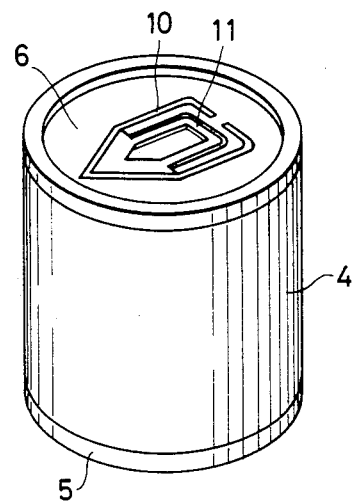
FIG. 2 is a perspective view showing a can-like container with a round cover to which the invention relates.
Figure 5:
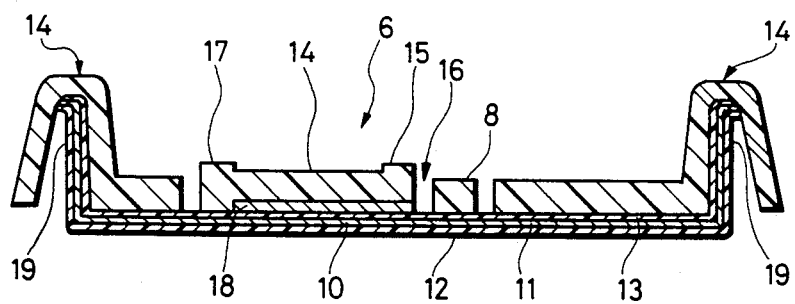
FIG. 5 is a sectional view of the round cover.

The round cover shown in FIGS. 2 and 5 was molded in the same manner as that of Example 1.

The insertion accuracy of the round cover thus molded was similar to that of example 1.

As is apparent from the above description, even if the insert is obliquely moved into the metal mold by the robot, it is accurately set in place because it is guided by the guide member such as a stripper plate, and it is fixedly held in the metal mold by the guide member and, when desired, with the aid of the vacuum cylinder. Therefore, the displacement of the insert during the molding operation is prevented. Accordingly, the insert molding produced has a high insertion accuracy and low manufacturing cost. Furthermore, as the molding operation can be achieved at high speed, the method of the invention attains high productivity.

Moreover, in the above-described embodiments, the insert is inserted into the metla mold by the robot; however, the insertion may be achieved by other means, for instance, guide rails.

Furthermore, in the above-described embodiments, a two-plate metal mold assembly is used; however, the technical concept of the invention is applicable to a three-plate metal mold assembly, and other metal mold assemblies. In addition, the core mold and the cavity mold may be reversed.

Figure 16:
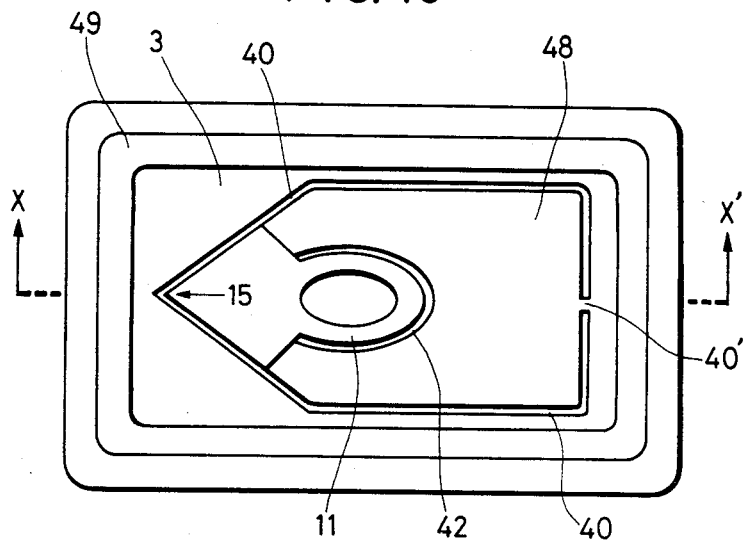
FIGS. 16, 18, 20, 22, 24 and 26 are top views of respective further embodiments of container tope of the invention.
Figure 17:
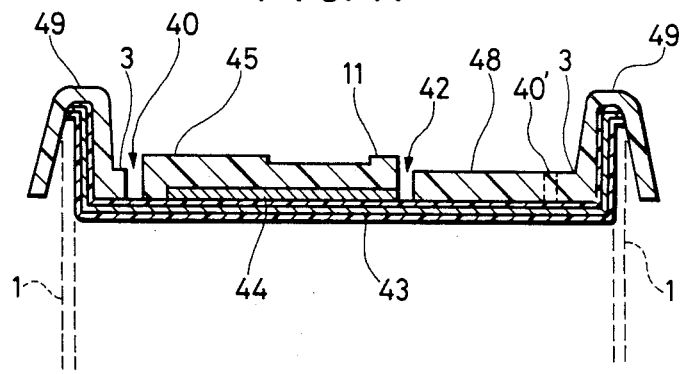
FIGS. 17, 19, 21, 23, 25 and 27 are cross-sectional views of the covers of FIGS. 16, 18, 20, 22, 24 and 26, respectively.

FIG. 16 is an enlarged plan view of the retangular cover in FIG. 1. FIG. 17 is an enlarged sectional view taken along line X—X' in FIG. 16. In FIGS. 16 and 17, reference numerals 47, 48 and 49 designate second resin layers. The second resin layer 48 is distinguished from the second resin layers 47 and 49 by a groove 40. In FIG. 16, reference numeral 40' designates a bridge. A handle (or pull-top) 15 is formed in the second resin layer 48. In FIGS. 16 and 17, reference numeral 42 designates an inner groove to facilitate the lifting of the handle 15. No second resin layer is formed in the inner groove 42 and in the groove 40, i.e., a multi-layer sheet 43 is exposed therein. These grooves are formed by a metal mold so that the cover can be readily opened. In the embodiment shown in FIG. 17, the multi-layer sheet 43 is manufactured by forming resin layers on both sides of a gas barrier type base material.

In FIG. 17, reference numeral 44 designates a treatment layer to facilitate the peeling of the handle. The treatment layer 44 may be formed over all the area of the handle or a part of the area; however, it is preferable that it be formed on the entire rear surface of the handle.

When the handle 15 is lifted, the handle 15 is readily peeled off the multi-layer sheet 43 while going inside at the position 45 to cut the multi-layer sheet 43 so that the cover is readily opened along the groove 40. In FIG. 4, reference numeral 46 designates two opposed parts of the side wall.

Figure 18:
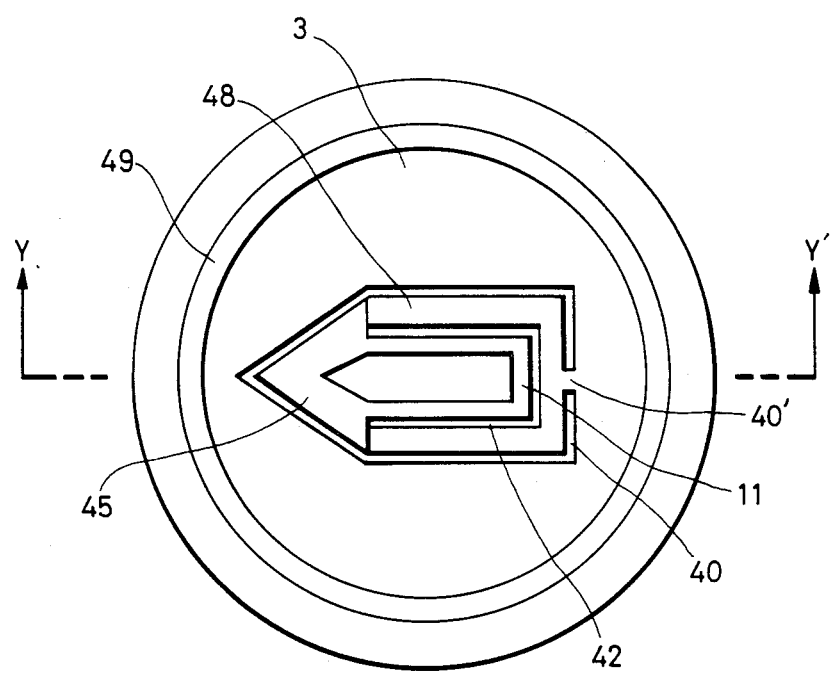
Figure 19:
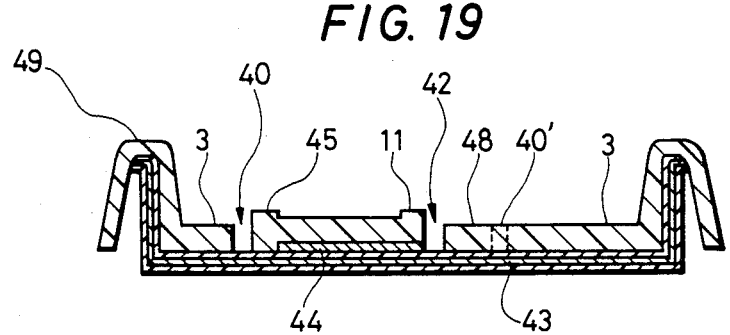

FIG. 18 is an enlarged plan view of the round cover shown in FIG. 2. FIG. 19 is an enlarged sectional view taken along line Y—Y' in FIG. 18. In FIGS. 18 and 19, those parts having the same functions as those in FIGS. 16 and 17 are therefore designated by the same reference numerals. As in the rectangular cover shown in FIGS. 16 and 17, the handle 15 can be readily opened.

In order to clarify the effects of these embodiments of invention, specific examples thereof will be described.

EXAMPLE 4

A multi-layer sheet having a structure and a thickness as indicated in Table 1, which was coated with rubber series gravure printing ink, was inserted into a stripper plate provided for a metal mold and fixedly held therein by means of a robot. Under this condition, the rectangular cover shown in FIG. 16 was molded by injection molding. An injection molding machine IS-50A(30Z) made by Toshiba Co. was used. The injection molding resin material used was ethylene propylene block copolymer ("Shoaroma" MK 411C (made by Showa Denko Co.) MFR 10.0 g/10 min.). The molding conditions were as follows:

Cylinder temperature—280° C.

| NH | $H_1$ | $H_2$ | $H_3$ |
| --- | --- | --- | --- |
| 260 | 280 | 260 | 240° C. |

Injection Pressure:
 Primary pressure—110 kg/cm$^2$
 Secondary pressure—70 kg/cm$^2$
 Mold closing pressure—120 kg/cm$^2$

COMPARISON EXAMPLE 1

A rectangular cover was manufactured in the same manner as that of Example 4 with the exception that a multi-layer sheet not coated with the printing ink was used.

EXAMPLE 5

The rectangular cover shown in FIG. 16 was manufactured by compression forming. That is, an oil pressure 50-ton press made by Amino Press Co. of Japan was used. An insert prepared by applying rubber series gravure printing ink to aluminum foil having ethylene propylene block copolymer (MFR. 1.1, ethylene content 9 wt%) layers on both sides was inserted into the mold in advance. Under this condition, the compression forming was carried out by supplying a heated resin sheet of ethylene propylene block copolymer ("Shoaroma"), MFR 0.7 g/10 min.).

COMPARISON EXAMPLE 2

A rectangular cover was made by compression forming in the same manner as that in Example 5 with the exception that a multi-layer sheet not coated with the printing ink was used.

EXAMPLES 6 THROUGH 15

Container covers were manufactured by injection molding or compression forming with multi-layer sheets and printing ink treatment (treatment layers) as shown in Table 1.

COMPARISON EXAMPLES 3 THROUGH 7

Container covers were formed with multi-layer sheets as shown in Table 1. These Comparison Examples 3 through 7 correspond to Examples 6 through 10 in which no peeling treatment was employed.

TABLE 1

| Example No. | Multi-Layer Sheet | Peeling Treatment (Treatment Layer) | Forming Method | Peelability |
| --- | --- | --- | --- | --- |
| 4 | Outer resin layer (1)/ (30μ) aluminum foil/inner resin layer (15μ) (70μ) | Rubber series | Injection Molding | Satisfactory |
| 5 | Resin (1)/ aluminum foil/resin (1) (15μ) | Rubber series | Press | Satisfactory |
| 6 | Resin (2)/saponified ethylene acetate vinyl copolymer/ (20μ) resin (2) | Rubber series | Injection molding | Satisfactory |
| 7 | Resin (3)/PVDc/resin (3) (20μ) | Rubber series | Injection molding | Satisfactory |
| 8 | Resin (1)/polyamide/resin (20μ) | Rubber series | Injection molding | Satisfactory |
| 9 | Resin (1)/PAN/resin (20μ) | Rubber series | Injection molding | Satisfactory |
| 10 | Resin (1)/aluminum foil/resin (1) | Rubber series | Injection molding | Satisfactory |
| 11 | Resin (1)/aluminum foil/resin (1) | Rubber series | Press | Satisfactory |
| 12 | Resin (1)/aluminum foil/resin (1) (30μ) (9μ) (70μ) | Polyamide series | Injection molding | Satisfactory |
| 13 | Resin (2)/aluminum foil/resin (2) | Nitro- | Injec- | Satis- |

TABLE 1-continued

| | Multi-Layer Sheet | Peeling Treatment (Treatment Layer) | Forming Method | Peelability |
|---|---|---|---|---|
| | (9μ) | cellulose series | tion molding | factory |
| 14 | Resin (3)/aluminum foil/resin (3) (9μ) | Paper seal Press | | Satisfactory |
| 15 | Resin (1)/aluminum foil/resin (1) (9μ) | "Cellotape" | Injection molding | Satisfactory |
| Comparison Example No. | | | | |
| 1 | Resin (1)/aluminum foil/resin (1) (30μ) (15μ) (70μ) | Not applied | Injection molding | Not peeled off |
| 2 | Resin (1)/aluminum foil/resin (1) (30μ) (15μ) (70μ) | Not applied | Press | Not peeled off |
| 3 | Resin (2)/saponified ethylene acetate vinyl copolymer/resin (2) | Not applied | Injection molding | Not peeled off |
| 4 | Resin (3)/PVDC/resin (3) | Not applied | Injection molding | Not peeled off |
| 5 | Resin (1)/polyamide/resin (1) | Not applied | Injection molding | Not peeled off |
| 6 | Resin (1)/PAN/resin (1) | Not applied | Injection molding | Not peeled off |
| 7 | Resin (1)/aluminum foil/resin (1) (9μ) | Not applied | Injection molding | Not peeled off |

Note:
Resin (1) Ethylene propylene block copolymer MFR = 1.1 Ethylene content 9 wt %
Resin (2) LDPE (high pressure method low density polyethylene) MI = 5.0 Density 0.920
Resin (3) HDPE (high density polyethylene) MI = 1.0 Density 0.950

As is apparent from the results of the above-described examples and comparison examples, the printing treatment or the equivalent treatment applied to the multi-layer sheet facilitates the opening of the cover with the handle.

The container cover of the invention can be manufactured at relatively low cost, and has the following excellent characteristics:

(1) As the printing treatment is applied to the multi-layer sheet which is in contact with the container cover handle or to the part of the multi-layer sheet where the latter is in contact with the handle, or the treatment layer such as a paper seal is provided in order to allow the handle to peel off the multi-layer sheet, the handle can be readily peeled off the multi-layer sheet, and accordingly the cover can be readily opened.

(2) The second layer is formed on the multi-layer sheet by insertion forming in such a manner that the former is welded to the latter by heat. Therefore, the second layer has a high adhesion strength and cannot be peeled off by heat cycling, for instance, in a retort treatment.

(3) The second resin layer and the thermally weldable resin layer (or the multi-layer sheet obtained by laminating the first resin layers) are laminated. Therefore, the cover can be readily welded by heating and has a retort characteristic. Accordingly, containers excellent from a food hygiene point of view can be made with the covers according to the invention.

Figure 20:
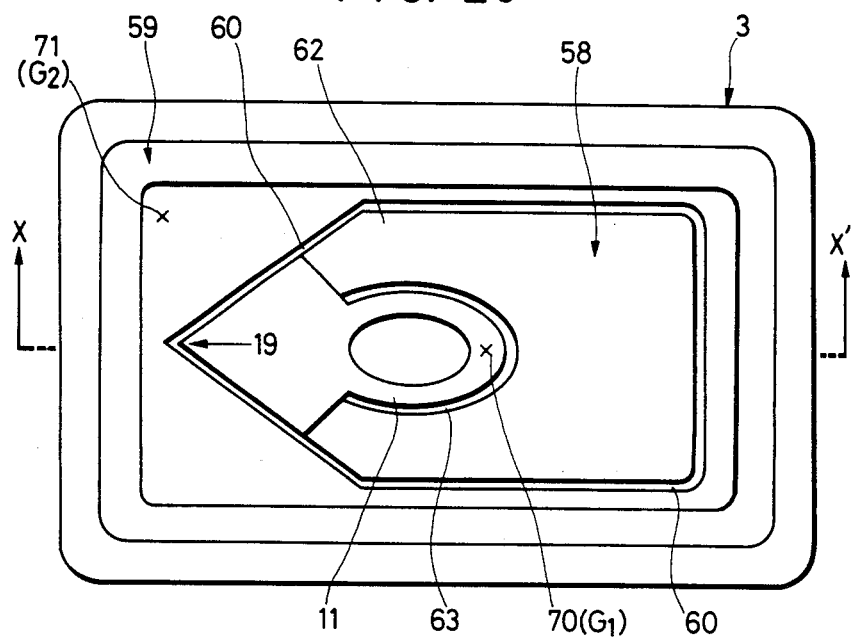
Figure 21:
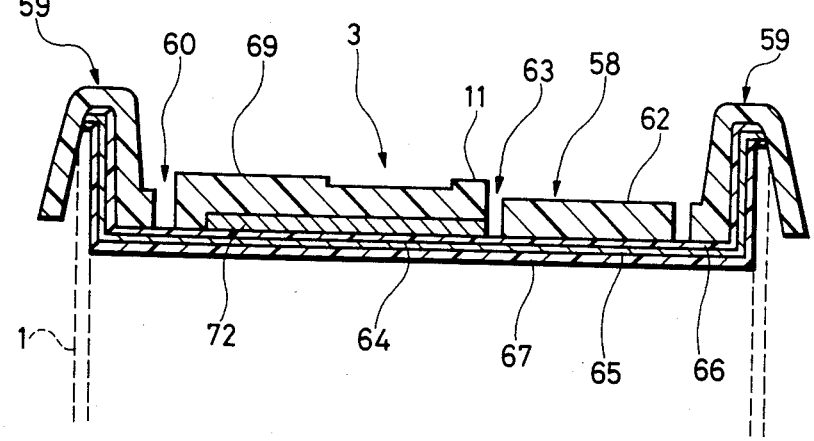

Further embodiments of the invention will now be described. In FIGS. 20 and 21, reference numeral 3 as before designates the cover; 58, an opening part formed by the second resin layer; 59, a peripheral part formed by the second resin layer; and 60, a slot. The slot 60 is in the form of a closed ring as shown in FIG. 20, and therefore the opening part 58 is completely separated from the peripheral part 59 by the slot 60. Further, in FIGS. 20 and 21, reference numeral 11 designates a handle provided on the opening part 58; and 62, a cutting opening part 62 by a groove 63.

In FIG. 21, reference numeral 64 designates a multi-layer sheet. In the case of FIG. 21, the multi-layer sheet is manufactured by forming first resin layers 66 and 67 on both sides of a gas barrier type base material. The can-like container's cover 3 according to the invention is fixedly mounted on the side wall 1 of the can-like container as shown in FIG. 21.

The rectangular cover 3 is opened as follows: When the handle 15 is raised with the fingertip inserted into groove 63, the handle 15 is peeled off the multi-layer sheet 64. As a result, the end 69 of the handle 1 goes inside the multi-layer sheet 64 to cut the latter. When, under this condition, the handle 15 is pulled, the multi-layer sheet 64 is cut along the slot 60 so that the opening part 58 of the cover is opened.

In the container's cover according to the invention, the opening part 58 is completely separated from the peripheral part 59 by the slot 60; i.e., no bridge is provided between the parts 68 and 69. Therefore, the opening part 58 can be readily opened. This readily openable container's cover can be produced using an injection molding method of the invention. The method will be described with reference to FIGS. 20 and 21. The opening part 58 and the peripheral part 59 are molded using respective gates. That is, the opening part 58 is independently molded using its gate, while the peripheral part 59 is also independently molded by using its own gate. The slot 60 is formed by the mold. At least one gate should be provided for molding the opening part 58, and similarly at least one gate should be provided for molding the peripheral part 59. The positions of the gates are indicated by reference characters 70(G1) and 71(G2) in FIG. 20. That is, the opening part 58 is molded using the gate 70(G1), while the peripheral part 59 is molded using the gate 71(G2).

In the injection molding method using a plurality of gates, the moldability is excellent and the injection molding operation can be achieved readily. Therefore, materials having a low moldability such as materials having small melting factors (MFR) resins with filters can be used in the injection molding method. As was described before, in the conventional method, it is necessary to take the moldability into consideration, i.e., it is necessary to select materials having a high fluidity, and it is difficult to use resins with filters. However, these problems have been solved by the provision of the injection molding method according to the invention.

Furthermore, in the molding method of the invention, the molding temperature and the injection pressure are considerably low, and the productivity (molding cycle) is high. In addition, in the invention, the slot is formed by the pushing action of the metal mold, and therefore it is preferable that the mold closing pressure is suitable for increasing the durability of the metal mold, preventing damage to the base material and preventing breakage of the slot. According to the invention, the mold closing pressure can be low. Depending on molding conditions, sometimes a product's corner material such as an aluminum foil may be broken in the mold during injection molding. However, such a problem can be eliminated by the low injection pressure employed with the invention.

According to the injection molding method of the invention, can-like container's covers having a high adhesion strength can be obtained as described above. Especially when a multi-layer sheet having thermally meltable first resin layers on its both sides is used, the first and second resin layers are in a molten state when molded, and are then welded together. Therefore, the resultant molding is high in adhesion strength and accordingly durable in the drop test.

On the other hand, the cover may suffer from the problem that the handle is also welded to the multi-layer sheet so that it cannot be peeled off the multi-layer sheet. However, this problem can be solved by applying a treatment for allowing the handle to peel off the multi-layer sheet to the part of the multi-layer sheet with which the handle is in contact. An example of the treatment is to use printing ink to form a treatment layer as described above.

Figure 22:
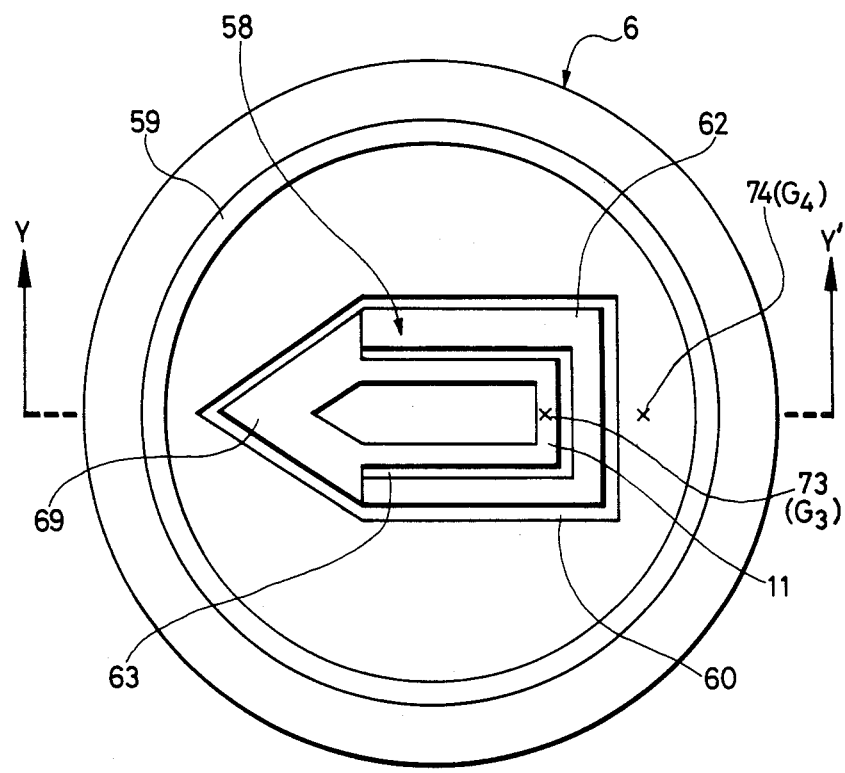
Figure 23:
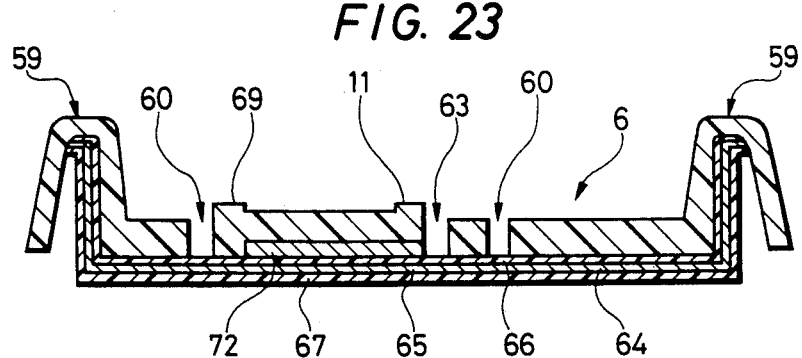

FIG. 22 is an enlarged plan view of the round cover of FIG. 2, and FIG. 23 is an enlarged sectional view taken along line Y—Y' in FIG. 22.

In FIGS. 22 and 23), parts designated by the same reference numerals are those in FIGS. 20 and 21 have the same functions, and their description will be omitted. The round cover is manufactured in the same manner as the rectangular cover in FIGS. 20 and 21, and can be readily opened. In FIG. 22, 73(G3) designates the position of a gate for the opening part 58, and 74(G4) the position of gate for the peripheral part 59. The opening part and the peripheral part are formed independently by using the respective gates G3 and G4.

In order to clarify the effects of the above embodiments of the invention, examples and comparison examples will now be described.

EXAMPLE 16

An injection molding machine IS-50A(30Z) made by Toshiba Co. was used to form the rectangular cover shown in FIG. 20.

Used for the formation of the cover was a multi-layer sheet which was fabricated by forming ethylene propylene block copolymer (MFR 1.1, ethylene content 9 wt%) layers on both sides of an aluminum foil. The injection molding operation was carried out with the multi-layer sheet fixedly held in the metal mold by the robot. The two gates G1 and G2 shown in FIG. 20 were used for molding. The slot was formed by the pushing action of the metal mold. The second resin layer, formed with the product "Shoaroma" manufactured by Showa Denko Co. (propylene ethylene block copolymer of NFR 10.0 g/10 min) was injected under cylinder temperature of 240° C. and an injection pressure of 60 kg/cm².

In the multi-layer sheet, the thicknesses of the outer first resin layer, the aluminum foil and the inner first resin layer were 30 microns, 15 microns and 70 microns, respectively. The second resin layer was formed on the outer resin layer to a thickness of 0.7 mm. The openability of the rectangular cover thus manufactured is indicated in Table 2, and the injection moldability is shown in Table 3. Table 4 indicates the results of comparison in molding conditions between Example 16 and Comparison Example 8 (described later).

EXAMPLE 17

The rectangular cover was made by injection molding in the same manner as that in Example 16 with the exception that, instead of "Shoaroma" MK411C, a resin prepared by adding calcium carbide 40% to that resin was used, and the cylinder temperature and the injection pressure were set to 260° C. and 80 kg/cm², respectively. Similar to Example 16, the openability and the injection moldability of the rectangular cover were evaluated. The results of evaluation are as indicated in Tables 2 and 3.

COMPARISON EXAMPLE 8

The injection molding operation was carried out by using the gate G1 in FIG. 20. For this purpose, four bridges were formed in the slot 60 at intervals (each bridge having a width of 0.5 mm). The molding resin was injected in the same manner as that in Example 16. The results of the injection molding operation are as indicated in Tables 2 and 3. The bridges made it difficult to open the cover. Although the cylinder temperature and the injection pressure were set to 280° C. and 110 kg/cm², respectively, the moldability was lower than that of Example 16 or 17. The results of comparison in molding conditions between Comparison Example 8 and Example 16 are indicated in Table 4.

COMPARISON EXAMPLE 9

The injection molding operation was conducted in the same manner as that in Comparison Example 8, with the exception that, instead of gate G1, the gate G2 was used. The results of the injection molding operation are indicated in Tables 2 and 3. As in Comparison Example 8, the openability was low and the moldability also low.

EXAMPLE 18

A round cover as shown in FIG. 2 was formed in the same manner as that in Example 16, with the exception that the gates G3 and G4 (in FIG. 22) were used and the cylinder temperature and the injection pressure were set to 240° C. and 55 kg/cm$^2$, respectively. The results are as indicated in Tables 2 and 3.

COMPARISON EXAMPLE 10

The injection molding operation was performed in the same manner as that in Comparison Example 8, with the exception that one gate (G3) was used, four bridges 0.6 mm in width were formed in the slot 60, and the injection pressure was set to 100 kg/cm$^2$. The results are as shown in Tables 2 and 3.

TABLE 2

(Openability Evaluation)

| | Openability Evaluation |
|---|---|
| Example 16 | Opening part opened readily without forming burrs. |
| Example 17 | Opening part opened readily without forming burrs. |
| Example 18 | Opening part opened readily without forming burrs. |
| Comparison Example 8 | Bridges made it difficult to open cover. |
| Comparison Example 9 | Bridges made it difficult to open cover. |
| Comparison Example 10 | Bridges made it difficult to open cover. |

TABLE 3

(Ejection Moldability Evaluation)
MK411C, or MK411C + Calcium Carbide 40%

| | Cylinder Temperature (°C.) | Injection Pressure (kg/cm$^2$) | Moldability |
|---|---|---|---|
| Example 16 | 240 | 60 | Very good |
| Example 17 | 260 | 80 | " |
| Example 18 | 240 | 55 | " |
| Comparison Example 8 | 280 | 110 | Poor |
| Comparison Example 9 | 280 | 110 | " |
| Comparison Example 10 | 280 | 110 | " |

TABLE 4

(Detailed Comparison of Molding Condition)

| | Example 16 | | | | Comparison Example 8 | | | |
|---|---|---|---|---|---|---|---|---|
| | NH | H$_1$ | H$_2$ | H$_3$ | NH | H$_1$ | H$_2$ | H$_3$ |
| Cylinder Temperature | 230 | 240 | 240 | 220° C. | 260 | 280 | 260 | 240° C. |
| Injection Primary Pressure | 60 kg/cm$^2$ | | | | 110 kg/cm$^2$ | | | |
| Injection Secondary Pressure | 40 kg/cm$^2$ | | | | 70 kg/cm$^2$ | | | |
| Mold Closing Pressure | 70 kg/cm$^2$ | | | | 120 kg/cm$^2$ | | | |

(MK 411C Molding condition)

As is clear from the above-described Examples 16, 17 and 18, the covers of the invention could be opened readily without forming burrs along the edges of the opening part, and were excellent in moldability. The molding temperature and the injection pressure could be considerably low. Accordingly, the productivity (molding cycle) was high. In addition, even a material mixed with a filter low in moldability could be used. Thus, Examples 16 through 18 were clearly different from Comparison Examples 8 through 10.

In the invention, the slot is formed by the pushing action of the metal mold, and therefore it is desirable that the mold closing pressure be low (the low mold closing pressure increasing the durability of the metal mold and preventing the breakage of the slot formed on the multi-layer sheet). The mold closing pressure was much lower than that in the comparison examples.

Depending on the molding conditions, the aluminum foil may be broken at the corner in the metal mold during the injection. However, this problem can be eliminated by the low injection pressure as mentioned above.

As is apparent from the above description, a can-like container's cover can be manufactured at relatively low cost by the method of the invention, and has the following excellent effects:

(1) As the opening part (with the handle) and the peripheral part which are separated by the slot from each other are formed by using the respective gates, the injection molding operation can be achieved readily, and the multi-layer sheet inserted in the metal mold can be protected from being creased or damaged.

(2) Because of the excellent moldability, the container's cover can be molded even with a material low in moldability.

(3) The opening part (with the handle) and the peripheral part are isolated from each other by the closed-ring-shaped slot. therefore, only the multi-layer sheet is cut in opening the cover. Thus, the container's cover of the invention is excellent in openability.

(4) As the treatment layer for facilitating the peeling of the handle is provided, the handle can be readily peeled off the multi-layer sheet, and therefore the container's cover can be opened more readily.

(5) The container's cover according to the invention is excellent in retort characteristics and with respect to food hygiene considerations. Therefore, the employment of the container's cover according to the invention allows the provision of a container which can preserve food for a long period of time.

As is apparent from the above description, the cover according to the invention has excellent effects, and therefore it has a wide range of applications. Typically, the cover can be used for manufacturing the following containers:

(1) Coffee cans, and soup cans
(2) Edible (cooking) oil cans, and seasoning cans
(3) Packing cans
(4) Motor oil cans In the embodiments of the invention described above, in view of the openability of the can-like container's cover, the durability of the can-like container, the can breaking strength, and the fracture strength in the insert molding operation, it is desirable that the first resin layer of the multi-layer sheet be 100 microns or less in thickness, and the gas barrier type base material such as an aluminum foil be 50 microns or less, preferably 9 to 30 microns.

If the thickness of the multi-layer sheet, especially the thickness of the metal foil (aluminum) is suitably selected in the invention, the can-like container can be completely incinerated. Recently, much can pollution has occurred. However, with the can-like container of the invention, can pollution can be significantly reduced because the container of the invention can be completely incinerated if the thickness of the aluminum foil and the resin material of the multi-layer sheet are suitably selected. The heat energy required for incinerating the container is as low as 5000 to 6000 Kcal/kg.

Figure 24:
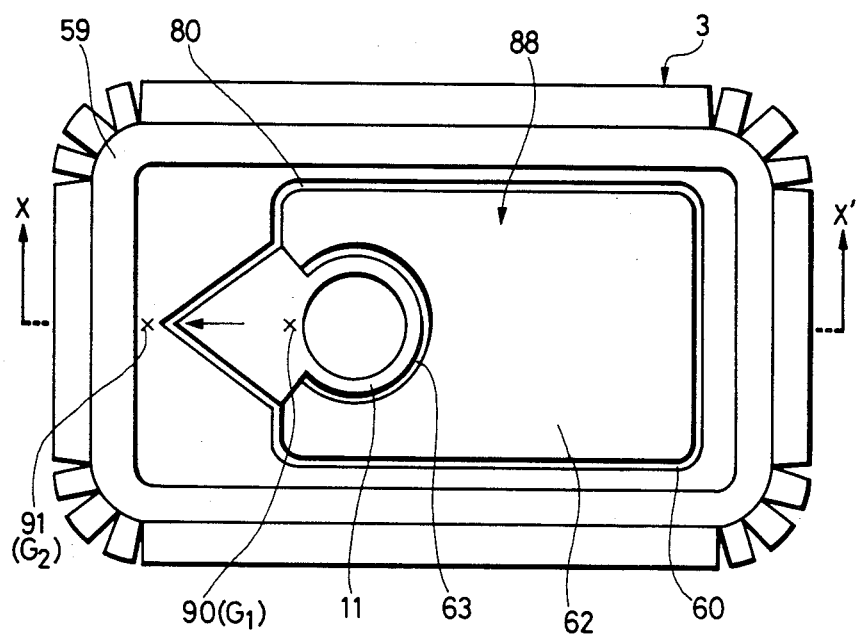

In other embodiments of the invention, in the second resin layer formed on the multi-layer sheet, the opening part and the peripheral part are completely separated by the slot. In this connection, it may be considered that when the container with the cover according to the invention is opened, the opening part may be carelessly disposed of. In order to prevent such, i.e., in order to prevent the complete removal of the opening part from the cover, the opening part may be coupled to the peripheral part through coupling parts, namely, bridges, to the extent that the openability is not lowered. For instance, as shown in the embodiment of FIG. 24, the right-hand portion of the opening part 2 may be coupled to the peripheral part through the bridges.

In the above-described molding method using a plurality of gates, the molding temperature and the injection pressure are considerably low, and the productivity (molding cycle) is high. In addition, in accordance with the above embodiments of the invention, the slot is formed by the pushing action of the metal mold, and therefore it is preferable that the mold closing pressure be low. That is, a low molding closing pressure is suitable for increasing the durability of the metal mold, preventing damage to the base material and preventing breakage of the slot.

Figure 25:
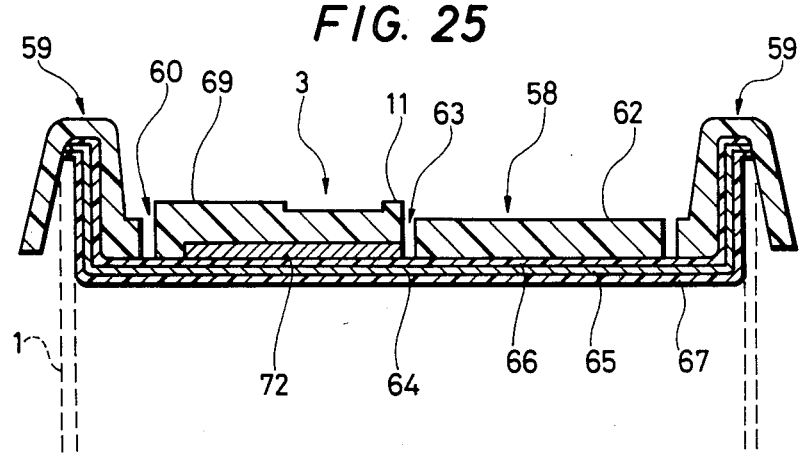

In FIG. 25, reference numeral 72 designates a treatment layer which is formed to allow the handle 15 to peel off the multi-layer sheet 64. In opening the container's cover, the treatment layer facilitates the peeling of the handle 15 from the multi-layer sheet 64. That is, the treatment layer in association with the slot 60 completely separating the opening part 58 from the peripheral part 59 functions to allow the cover to open more readily. Any treatment of the types described above may be employed.

Figure 26:
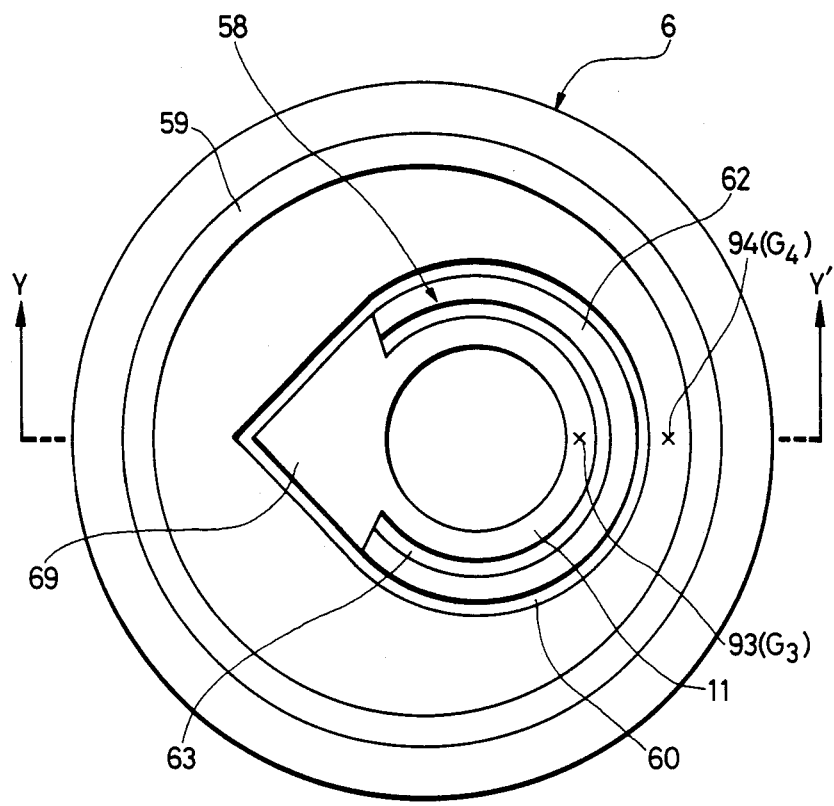
Figure 27:
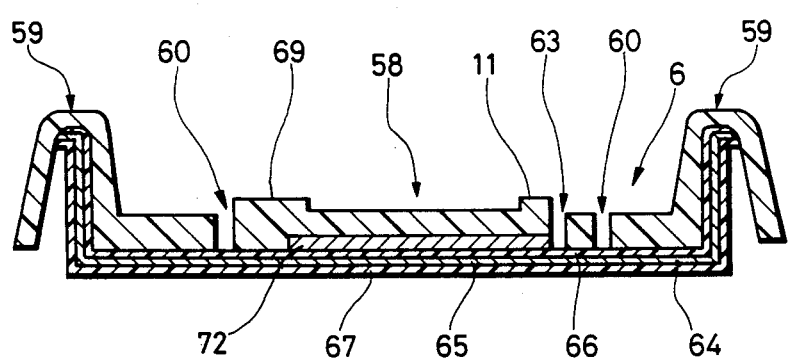

FIG. 26 is an enlarged plan view of a round cover of the present embodiment, and FIG. 27 is an enlarged sectional view taken along line Y—Y' in FIG. 26.

In FIGS. 6 and 7, parts designated by the same reference numerals as those in FIGS. 24 and 25 have the same functions, and their description will be omitted. The round cover is manufactured in the same manner as the rectangular cover in FIGS. 24 and 25, and it is high both in adhesion strength and in impact resistance, and can be readily opened. In FIG. 26, 93(G3) designates the position of a gate for the opening part 58, and 94(G4) the position of a gate for the peripheral part 59. The opening part and the peripheral part are formed independently by using the respective gates G3 and G4.

In order to clarify the effects of the invention, further examples and comparison examples will be described.

EXAMPLE 19

Figure 3:
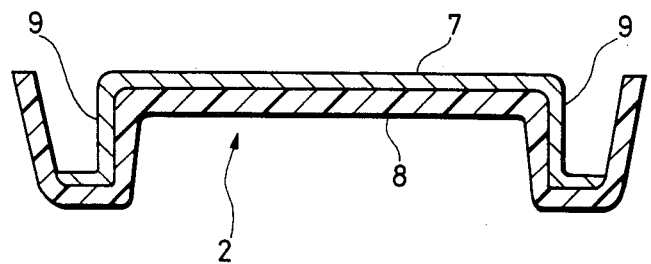
FIG. 3 is a sectional side view of the bottom of the container.

An injection molding machine IS-50A(30Z) manufactured by Toshiba Co. was used to form the rectangular cover shown in FIG. 3.

A multi-layer sheet which was fabricated by forming ethylene propylene block copolymer (I) (MFR 1.1, ethylene content 9 wt%) layers on both sides of an aluminum foil was used. Rubber group gravure printing ink was applied to the part of the multi-layer sheet which was to be covered by the handle. A robot was used to fixedly hold the thus-treated multi-layer sheet in the stripper plate of dhe metal mold. Under this conditon, the injection molding operation was carried out. The two gates G1 and G2 shown in FIG. 24 were used for molding. The slot was formed by the pushing action of the metal mold. The second resin layer was formed by injecting propylene ethylene block copolymer (II) of MFR 10.0 g/10 min with a cylinder temperature of 240° C. and an injection pressure of 60 kg/cm$^2$.

In the multi-layer sheet, the thicknesses of the outer first resin layer, the aluminum foil and the inner first resin layer were 30 microns, 15 microns and 70 microns, respectively. The second resin layer was formed on the outer first resin layer to a thickness of 0.7 mm. The openability of the rectangular cover thus manufactured is indicated in Table 5, the peelability of the handle is indicated in Table 6, and the injection moldability is indicated in Table 7. Table 8 indicates the results of comparison in molding conditions between Example 19 and Comparison Example 11 (described below).

EXAMPLE 20

A rectangular cover was formed by injection molding in the same manner as that in Example 19 with the exception that, instead of the block copolymer (II), a resin prepared by adding calcium carbide 40% to the resin was used, and the cylinder temperature and the injection pressure were set to 260° C. and 80 kg/cm$^2$, respectively. As in Example 19, the openability of the cover, the peelability of the handle, and the injection moldability were evaluated. The results are indicated in Tables 5, 6 and 7.

EXAMPLES 21 THROUGH 31

The injection molding operations were carried out in the same manner as that in Example 19 with the exception that different multi-layer sheets and different printing inks (or treatment layers) were employed as indicated in Table 6. The covers were evaluated for the peelability of the handle as indicated in Table 6.

The evaluations of the cover formed by compression forming are also indicated in Table 6. In the compression forming, a 50-ton press manufactured by Amino Press Co. was used. The multi-layer sheet indicated in Table 7 was inserted in the mold. Under this condition, the compression forming was carried out by supplying a molten second resin (propylene ethylene block copolymer of MFR 2.0 g/10 min).

COMPARISON EXAMPLE 11

The injecton molding operation was carried out by using the gate G1 in FIG. 24. For this purpose, four bridges were formed in the slot 60 at intervals (each bridge having a width of 0.5 mm). The molding resin was injected in the same manner as that in Example 19. The results of the injection molding operation are as indicated in Tables 5 and 7. The bridges made it difficult to open the cover. Although the cylinder temperature and the injection pressure were set to 280° C. and 110 kg/cm$^2$, respectively, the moldability was lower than that of Example 19 or 20. The results of comparison in molding conditions between Comparison Example 11 and Example 19 are indicated in Table 8.

COMPARISON EXAMPLE 12

An injection molding operation was conducted in the same manner as in Comparison Example 11, with the exception that, instead of the gate G1, the gate G2 was used. The results of the injection molding operation are indicated in Tables 5 and 7. Similar to Comparison Example 11, both the openability and the moldability were low.

EXAMPLE 32

A round cover as shown in FIG. 26 was formed in the same manner as that in Example 19, with the exception that the gates G3 and G4 (FIG. 26) were used and the cylinder temperature and the injection pressure were set to 240° C. and 55 kg/cm$^2$, respectively. The results are as indicated in Tables 5, 6 and 7.

COMPARISON EXAMPLE 13

An injection molding operation was performed in the same manner as that in Comparison Example 11, with the exception that one gate (G3) was used, four bridges 0.6 mm in width were formed in the slot 10, and the injection pressure was 100 kg/cm$^2$. The results are as shown in Tables 5 and 7.

COMPARISON EXAMPLES 14 THROUGH 20

Different multi-layer sheets indicated in Table 6 were used, and the injection molding operations or the compression forming operations were carried out in the same manner as those in Examples 19 and 21 through 31, except that no treatment for peeling the handle off the multi-layer sheet was applied. The container's covers thus manufactured were evaluated for the peelability of the handles as indicated in Table 6.

TABLE 5
(Openability Evaluation)

| | Openability Evaluation |
|---|---|
| Example 19 | Opening part opened readily without forming burrs. |
| Example 20 | Opening part opened readily without forming burrs. |
| Example 32 | Opening part opened readily without forming burrs. |
| Comparison Example 11 | Bridges made it difficult to open cover. |
| Comparison Example 12 | Bridges made it difficult to open cover. |
| Comparison Example 13 | Bridges made it difficult to open cover. |

TABLE 6

| Example No. | Multi-Layer Sheet | Peeling Treatment (Treatment Layer) | Forming Method | Peelability |
|---|---|---|---|---|
| 19 | Outer resin layer (1)/ (30μ) aluminum foil/inner resin layer (15μ) (70μ) | Rubber series | Injection Molding | Satisfactory |
| 20 | Outer resin layer (1)/ (30μ) aluminum foil/inner resin layer (15μ) (70μ) | Rubber series | Injection Molding | Satisfactory |
| 21 | Resin (1)/ aluminum foil/resin (1) (15μ) | Rubber series | Press | Satisfactory |
| 22 | Resin (2)/saponified ethylene acetate vinyl copolymer/ (20μ) resin (2) | Rubber series | Injection molding | Satisfactory |
| 23 | Resin (3)/PVDc/resin (3) (20μ) | Rubber series | Injection molding | Satisfactory |
| 24 | Resin (1)/polyamide/resin (20μ) | Rubber series | Injection molding | Satisfactory |
| 25 | Resin (1)/PAN/resin (20μ) | Rubber series | Injection molding | Satisfactory |
| 26 | Resin (1)/aluminum foil/resin (1) | Rubber series | Injection molding | Satisfactory |
| 27 | Resin (1)/aluminum foil/resin (1) | Rubber series | Press | Satisfactory |
| 28 | Resin (1)/aluminum foil/resin (1) (30μ) (9μ) (70μ) | Polyamide series | Injection molding | Satisfactory |
| 29 | Resin (2)/aluminum foil/resin (2) (9μ) | Nitrocellulose series | Injection molding | Satisfactory |
| 30 | Resin (3)/aluminum foil/resin (3) (9μ) | Paper seal Press | | Satisfactory |
| 31 | Resin (1)/aluminum foil/resin (1) (9μ) | "Cellotape" | Injection molding | Satisfactory |
| 32 | Outer resin layer (1)/ (30μ) aluminum foil/inner resin layer (15μ) (70μ) | Rubber series printing ink | Injection molding | Satisfactory |
| Comparison Example No. | | | | |

TABLE 6-continued

| | Multi-Layer Sheet | | | Peeling Treatment (Treatment Layer) | Forming Method | Peel-ability |
|---|---|---|---|---|---|---|
| 14 | Resin (1)/aluminum foil/resin (1) (30μ) (15μ) (70μ) | | | Not applied | Injection molding | Not peeled off |
| 15 | Resin (1)/aluminum foil/resin (1) (30μ) (15μ) (70μ) | | | Not applied | Press | Not peeled off |
| 16 | Resin (2)/saponified ethylene acetate vinyl copolymer/resin (2) | | | Not applied | Injection molding | Not peeled off |
| 17 | Resin (3)/PVDC/resin (3) | | | Not applied | Injection molding | Not peeled off |
| 18 | Resin (1)/polyamide/resin (1) | | | Not applied | Injection molding | Not peeled off |
| 19 | Resin (1)/PAN/resin (1) | | | Not applied | Injection molding | Not peeled off |
| 18 | Resin (1)/aluminum foil/resin (1) (9μ) | | | Not applied | Injection molding | Not peeled off |

Note:
Resin (1) Ethylene propylene block copolymer MFR = 1.1 Ethylene content 9 wt %
Resin (2) LDPE (high pressure method low density polyethylene) MI = 5.0 Density 0.920
Resin (3) HDPE (high density polyethylene MI = 1.0 Density 0.950

TABLE 7

(Ejection Moldability Evaluation)

| | Cylinder Temperature (°C.) | Injection Pressure (kg/cm$^2$) | Moldability |
|---|---|---|---|
| Example 19 | 240 | 60 | Very good |
| Example 20 | 260 | 80 | " |
| Example 32 | 240 | 55 | " |
| Comparison Example 11 | 280 | 110 | Poor |
| Comparison Example 12 | 280 | 110 | " |
| Comparison Example 13 | 280 | 100 | " |

TABLE 8

(Detailed Comparison of Molding Condition)

| | Example 19 | | | | Comparison Example 11 | | | |
|---|---|---|---|---|---|---|---|---|
| | NH | H$_1$ | H$_2$ | H$_3$ | NH | H$_1$ | H$_2$ | H$_3$ |
| Cylinder Temperature | 230 | 240 | 240 | 220° C. | 260 | 280 | 260 | 240° C. |
| Injection Primary Pressure | 60 kg/cm$^2$ | | | | 110 kg/cm$^2$ | | | |
| Injection Secondary Pressure | 40 kg/cm$^2$ | | | | 70 kg/cm$^2$ | | | |
| Mold Closing Pressure | 70 kg/cm$^2$ | | | | 120 kg/cm$^2$ | | | |

(MK 411C Molding condition)

EXAMPLES 33 AND 34, AND COMPARISON EXAMPLES 21 THROUGH 24

A rectangular cover was formed in the same manner as that in Example 19, except that a multi-layer sheet consisting of an outer resin layer 70 microns in thickness, an aluminum foil 15 microns in thickness and an inner resin layer 70 microns in thickness was used. The rectangular cover thus formed was welded to a container body consisting of a bottom and a side wall to form a sealed can-like container as shown in FIG. 1. A drop test was applied to the can-like container thus formed (Example 33).

A round cover was formed in the same manner as that in Example 32, with the exception that a multi-layer sheet consisting of an outer resin layer 70 microns in thickness, an aluminum foil 15 microns in thickness, and an inner resin layer 70 microns in thickness was used. As in Example 33, the round cover was used to form a sealed can-like container, and a drop test was applied to the container (Example 34).

For comparison, the same multi-layer sheets and the same second resin layers were formed and were then bonded together by using an urethane adhesive to form a rectangular cover and a round cover, respectively. As in Examples 33 and 34, sealed can-like containers were formed with these covers, and drop tests were carried out on the can-like containers (Comparison Examples 21 and 22).

A sealed can-like container was formed using the rectangular cover with bridges formed using one gate as in Comparison Example 11. Another sealed can-like container was formed by using the round cover which was fabricated in Comparison Example 13. Drop tests were applied to these sealed can-like containers Comparison Examples 23 and 24). The multi-layer sheets used were the same as those in Examples 33 and 34.

The content of each rectangular can was about 350 cc in volume, and the content of each round can was about 250 cc.

The results of these drop tests are as indicated in Tables 9 and 10.

TABLE 9

| Impact Resistance | 50 cm | 60 cm | 80 cm | 100 cm | 120 cm |
|---|---|---|---|---|---|
| Example No.: | | | | | |
| Example 32 | o | o | o | o | x |
| Example 33 | o | o | o | o | o |
| Comparison Example 21 | o | o | x | x | — |

TABLE 9-continued

| Impact Resistance | 50 cm | 60 cm | 80 cm | 100 cm | 120 cm |
|---|---|---|---|---|---|
| Comparison Example 22 | o | o | o | x | x | o — Slot not damaged
x — Slot damaged
*Represented by a level (cm) from which the sealed can-like container is dropped in the drop test.

As is apparent from Table 9, the sealed can-like containers according to the invention are high in impact resistance. It is considered that this effect is due to the facts that the resin layers are sufficiently welded to the aluminum foil by thermal molding, and that, as the molding closing pressure can be low, the aluminum foil is protected from damage when the slot is formed by the pushing action of the metal mold.

TABLE 10

| Impact Resistance | 50 cm | 60 cm | 80 cm | 100 cm | 120 cm |
|---|---|---|---|---|---|
| Example No.: | | | | | |
| Example 32 | o | o | o | o | x |
| Example 33 | o | o | o | o | o |
| Comparison Example 23 | o | x | x | — | — |
| Comparison Example 24 | o | o | x | x | — |

As was described before, in Comparison Example 23, the can-like container was formed by using a rectangular cover which was formed by using one gate in such a manner that the slot had four bridges, and in Comparison Example 24, the can-like container was fomred by using a round cover which was also formed by using one gate in such a manner that the slot had four bridges. In each of the above-described Examples 31 and 32, the injection pressure was high and the mold closing pressure was also high (see Table 7). Therefore, the aluminum foil was damaged, being strongly pressed by the metal mold, with the results that the can-like container was low in impact strength.

EXAMPLES 35 THROUGH 41

Sealed can-like containers with rectangular covers were fabricated in the same manner as that in Example 33 except that multi-layer sheets different in outer resin layer, aluminum foil and inner resin layer thicknesses as indicated in Table 11 were used. The containers thus fabricated were tested for can breaking strength and openability. The test results are as listed in Table 11:

TABLE 11

| Item Example No. | Multi-Layer Sheet Thickness | Can Breaking Strength (cm) | Openability |
|---|---|---|---|
| Example 35 | 70/15/70 | 100 | o |
| Example 36 | 30/15/70 | 80 | o |
| Example 37 | 70/9/70 | 90 | o |
| Example 38 | 30/30/70 | 90 | o |
| Example 39 | 60/15/40 | 80 | o |
| Example 40 | 120/15/120 | more than 150 | x |
| Example 41 | 70/60/70 | more than 120 | x |

Note:
Represented by a level (cm)

EXAMPLES 42 THROUGH 46

Rectangular covers were formed in the same manner as that in Example 33, except that multi-layer sheets different in aluminum foil thickness as indicated in Table 12 were used. The relationships between the thickness of the aluminum foil and the completeness of incineration, aluminum foil breakage, and openability were obtained as indicated in Table 12:

TABLE 12

| | Aluminum Foil Thickness (microns) | Open-ability | Complete Inciner-ation | Aluminum Foil Breakage |
|---|---|---|---|---|
| Example 42 | 9 | o | o | o |
| Example 43 | 15 | o | o | o |
| Example 44 | 30 | o | o | o |
| Example 45 | 50 | Δ | o | o |
| Example 46 | 60 | x | Δ | o |

The aluminum foil thickness is an important factor affecting the ability to completely incinerate the can, its openability and the aluminum foil breakage. However, if the aluminum foil is at least 9 microns in thickness, then it can sufficiently block the permeation of oxygen, water, etc.

The thickness of the first resin layer somewhat affects the openability of the container's cover. However, if the aluminum foil thickness is 50 microns or less, then the container's cover can be easily opened. Aluminum blocks more than 60 microns in diameter cannot easily be completely incinerated.

It has been confirmed that if the aluminum foil thickness is further decreased, then the aluminum foil is liable to be broken at its edge portions during insertion molding, but such trouble will not occur if its thickness is 9 microns or more.

As is apparent from the above description, according to the invention, can-like containers are manufactured at a relatively low cost, and the can-like containers thus manufactured have the following excellent effects:

(1) The opening part (with the handle) and the peripheral part are isolated from each other by the closed-ring-shaped slot. Therefore, only the multi-layer sheet is cut in opening the cover. Thus, the container's cover of the invention is excellent in openability.

(2) As the treatment layer for facilitating the peeling of the handle is provided, the handle can be readily peeled off the multi-layer sheet, and therefore the container's cover can be opened more readily.

(3) In the case where the second resin layer is formed by using one gate in such a manner that it has the bridges over the slot, the injection pressure is unavoidably high, as a result of which the aluminum foil of the multi-layer sheet is damaged, and the can-like container is low in impact resistance. However, in the above embodiments of the invention, both the opening part (including the handle) and the peripheral part separated by the slot are molded using at least one gate. Therefore, the injection molding operation can be achieved readily, and the multi-layer sheet inserted in the metal mold can be protected from being creased or damaged. Accordingly, the can-like container having the container's cover according to the invention shows a high impact resistance in the drop test.

(4) Because of the excellent moldability, the container's cover can be molded even with a material having a low moldability.

(5) The container's cover according to the invention is excellent in retort characteristics and food hygiene. Therefore, the employment of the container's cover according to the invention allows the provision of a container which can preserve food for a long period of time.

Figure 28:
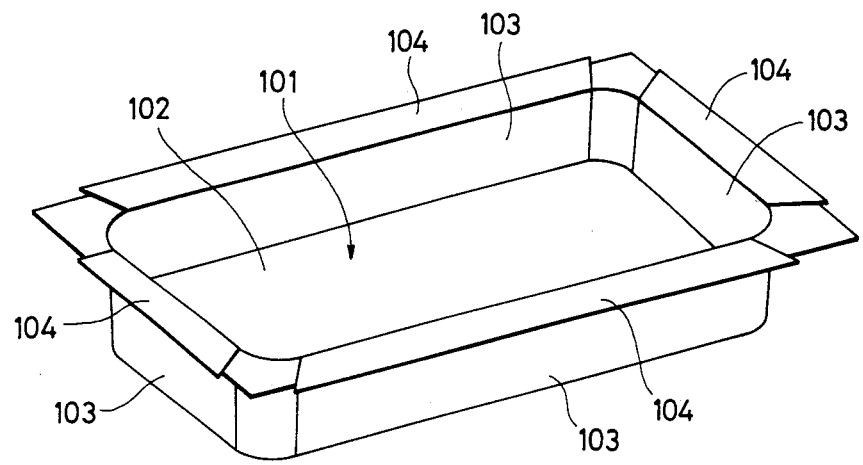
FIG. 28 is a perspective view showing a container body fabricated in accordance with one aspect of the present invention.

Referring now to FIG. 28, a further embodiment of the invention will now be described.

Specifically, FIG. 28 is a perspective view showing the body of a rectangular container constructed in accordance with the invention. Reference numeral 101 indicates a receptable portion for receiving contents such as food. The receptable 101 includes a bottom wall 102 and side walls 103 extending upwardly from the four sides of the bottom wall 102. Shoulders 104 extend outwardly from the upper edges of the side walls 103, generally at right angles therefrom.

Figure 29:
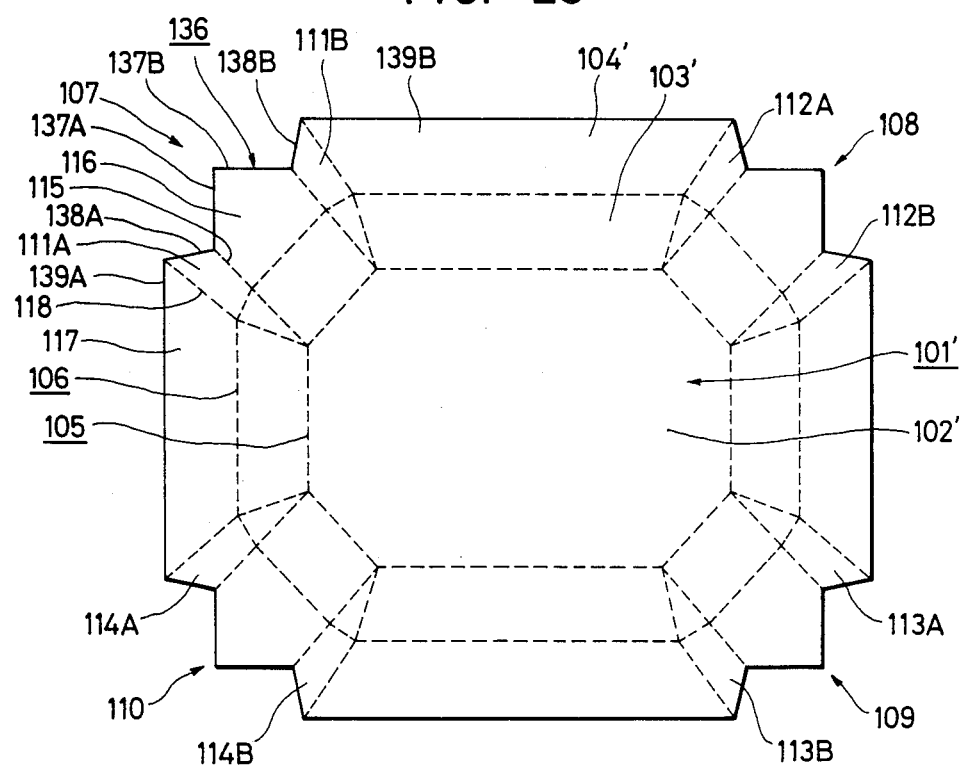
FIG. 29 is an exploded plan view showing the container body of FIG. 28 in the unfolded state.

FIG. 29 shows the receptable 101 in a plan view in the unfolded state. Reference numerals used commonly in FIGS. 28 and 29 denote like elements. Further, reference numeral 101' is a blank or sheet for forming the receptacle 101 of the container body. The sheet 101' includes a portion 102' used to form the bottom wall 102 of the container body, and portions 103' which form the side walls 103 of the container body. Portions 104' become the shoulders 104 of the container body in the folded state.

Fold lines 105 are formed between the bottom wall portion 102' and the side wall portions 103', while fold lines 106 are provided between the side wall portions 103' and the shoulder portins 104'.

An important feature of the present invention is the manner in which stress in the corner portions is accommodated when the blank is folded to form the receptacle 101 of the FIG. 28. More particularly, in accordance with the invention, the stress is accommodated in portions 107, 108, 109 and 110 in a manner to be described.

In FIG. 29, 111A, 111B, 112A, 112B, 113A, 113B, 114A and 114B indicate margin portions of the blank. In accordance with the invention, these margin portions are folded to form tucks, two at each of the four corners of the generally rectangular receptacle 101. Taking the margin portion 111A as an example, the margin portion 111A is folded under the corner portion 116 by bending along fold lines 115 and 118. This forms a three-layer tuck under the portion 116. The remaining margin portions are folded in the same way. Of course, it is preferred that the folding of all margin portions be effected simultaneously, as will now be described.

Figure 30:
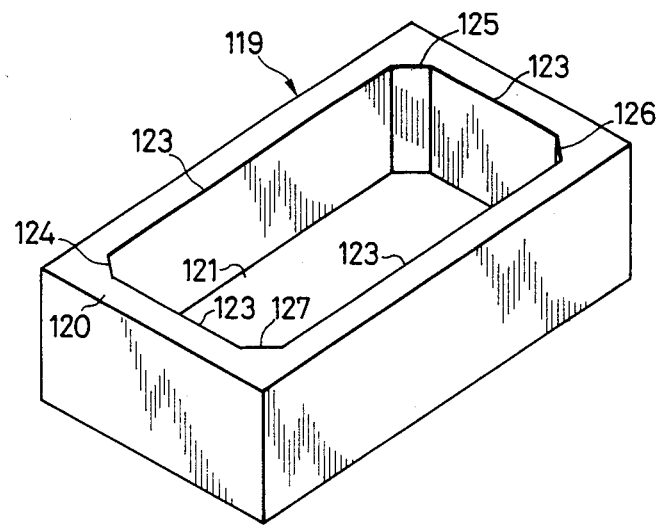
FIG. 30 is a perspective view showing a female mold used in the fabrication of the container body of the invention.
Figure 31:
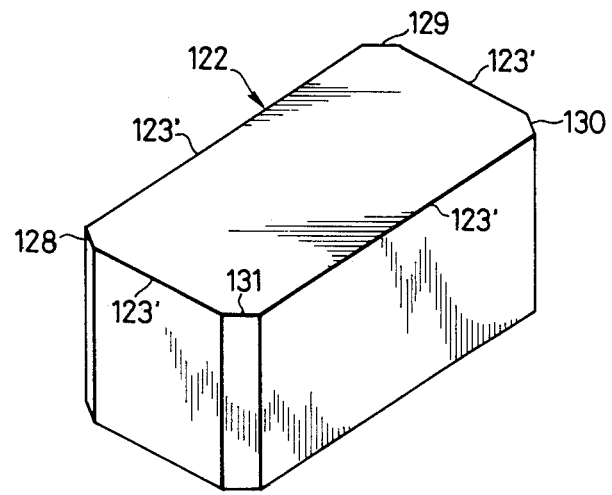
FIG. 31 shows a male mold used with the female mold of FIG. 30.

FIG. 30 shows a female mold and FIG. 31 a male mold used to form the receptacle 101 depicted in FIG. 28. The female mold 119 has a hollow portion 121 in the form of a rectangular solid at the center thereof. The hollow portion 121 is surrounded by a solid wall 124 having four corner portions 124, 125, 126 and 127 between straight side wall portions 123. The dimensions of the hollow poriton 121 are chosen to conform with the desired dimensions of the container body. The male mold 122 shown in FIG. 31 is a generally rectangular-solid member having four straight wall portions 123' and four corner portions 128, 129, 130 and 131.

To mold the receptacle 101 of FIG. 28, a blank having fold lines creased therein as shown in FIG. 29 is placed over one side of the female mold of FIG. 30 with the bottom portion 102' centered over the hollow portion 121. Then, the male mold 122 of FIG. 31 is depressed against the side of the blank and pressed into the hollow portion 121 of the female mold 119.

Figure 32:
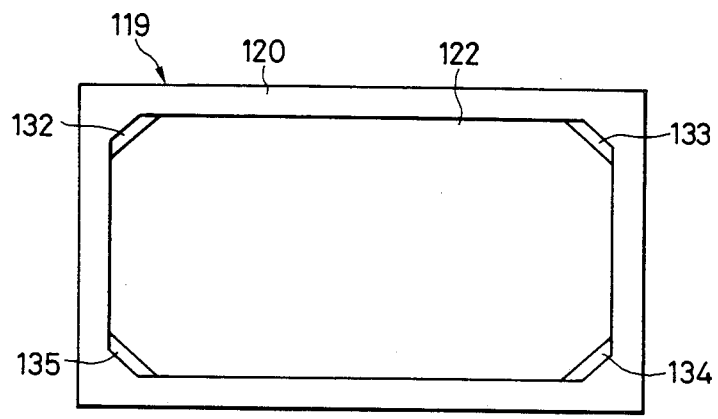
FIG. 32 shows the molds of FIGS. 30 and 31 assembled together.

As shown by the plan view of FIG. 32, gaps 132, 133, 134 and 135 are provided between the corner portions 128, 129, 130 and 131 of the male mold 122 and the respective corner portions 124, 125, 126 and 127 of the female mold 119, while only relatively small clearances are provided between the straight wall portions 123' of the male mold 122 and corresponding straight wall portions 123 of the female mold 119. This is done so that the tucks mentioned above are properly formed; that is, so that the margin portions 111A, 111B, 112A, 112B, 113A, 113B, 114A, and 114B are folded under the corresponding corner portions.

Preferably, the blank is cut to the outer shape depicted in FIG. 29 with "saw-teeth" 136 at each corner. Further, it is preferable that the blank be dimensioned so that edge lines 137A, 137B, etc., be aligned with the edge lines 139A, 139B, etc.

Figure 33:
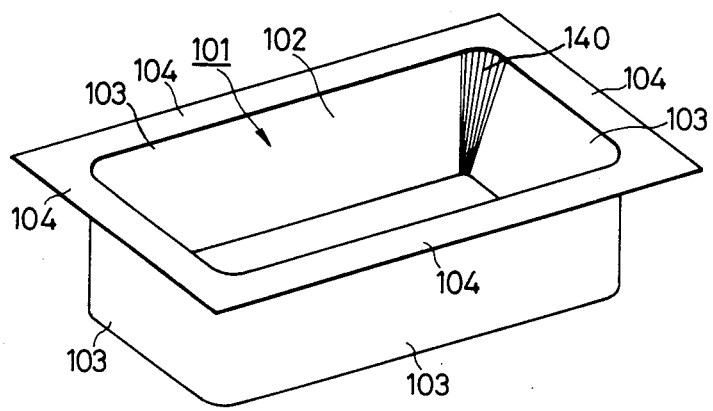
FIG. 33 is a perspective view showing another example of a container body of the present invention.

In a further embodiment of the invention, as depicted in FIG. 33, the corner portions of the container body are gathered as vertical wrinkles. That is, the receptacle 101 as defined by the bottom wall 102 and the side walls 103 is arranged with vertical wrinkles 140 at each of the four corners thereof. Further, if desired, the wrinkles may extend onto the shoulders 104.

In either case, that is, in the embodiment of FIG. 29 where the corner portions of the receptacle 101 are formed by providing two tucks at each corner portion and in the embodiment of the FIG. 33 where the corner portions are formed with vertical wrinkles, it is desirable to hot-melt or extend and smooth the resin of the multi-layer body while leaving the metal foil unextended to thereby provide a smooth surface and a substantially uniform thickness. Accordingly, the thickness of the metal foil can be relatively small, preferably, 40 $\mu$m or less, while yet providing the container with a sufficient strength and good appearance. Also, cracking and the formation of pin-holes are avoided. As an attendant advantage of employing a thin foil layer, particularly, a thin aluminum foil layer, the container can easily be completely incinerated, thereby making disposal of the container easier. Moreover, since, with the invention, it is unnecessary to cut the blank at any point which falls inside the container, there is no danger of contact of the metal with the contents (food) in the container. Still further, it is quite easy to provide the container with a sufficient depth.

To provide the creases along the fold lines 105 and 106 as described above, a hot-stamping process or the like can be used.

As described above, the container of FIGS. 28 through 33 is rectangular. However, it may be pentagonal, hexagonal, or any other shape as desired. As is apparent from the foregoing, it is preferable to gather the vertical wrinkles on the non-linear portion of the side wall portion.

As the material of the multi-layer sheet, as described above, it is preferable to use at least two layers, namely, a foil layer and a hot-melt resin layer formed on at least one side of the foil layer. Aluminum is preferred for the foil layer, however, other materials can be used as well. The thickness of the foil should be 40 $\mu$m or less, and can even be as thin as 7 $\mu$m due to the fact that the foil is not subjected to stretching during the formation of the container.

A variety of resins can be used. However, due to the preferential use of a hot-melting step, it is recommended that a resin which is suitable for such a process by employed. This is also desirable for attaching a cover to the receptacle using a hot-melt step, as will be described below in more detail. Specific examples of suitable resins include synthetic resins such as polyolefins, particularly, ethylenepropylene copolymer. Although the thickness of the resin layer is not especially limited, a thickness in a range of 50 to 100 $\mu$m may be employed although thicknesses as small as 40 μm can be employed.

Next, the structure and method of attachment of a cover to the container will be described.

The material of the cover is similar to that of the material of the receptacle, namely, the cover is formed by a sheet composed of a layer of metal foil having a layer of hot-melt resin provided on at least one side thereof. The cover is attached to the container body by a heat sealing step whereby the hot-melt resin of the cover is fused with the adjacent hot-melt resin layer of the container body.

Figure 34:
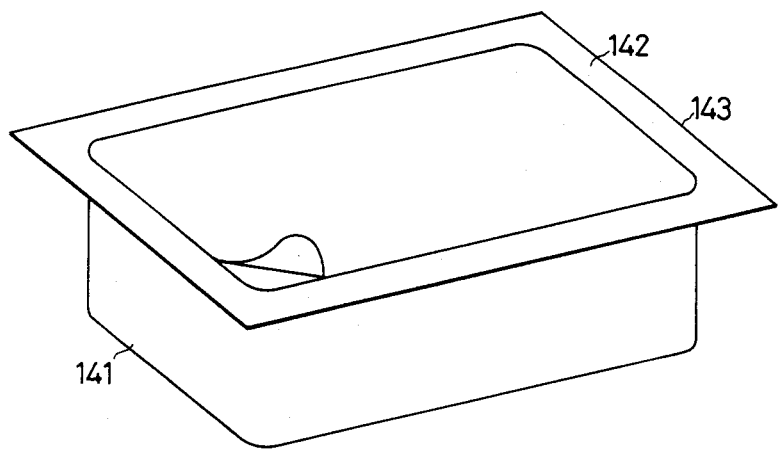
FIG. 34A is a perspective view showing a complete container of the present invention.
FIG. 34B is a cross-sectional view of the container of FIG. 34.

FIG. 34A shows an example of a container body 141 having a cover 142 joined thereto at peripheral edge portions 143. FIG. 34B is a cross-sectional view taken longitudinally through FIG. 34A.

As shown in FIG. 34B, the cover 142 is composed of a center foil layer 146 covered by two hot-melt resin layers 145 and 147 on the opposite sides thereof. The container body 141 is composed of a center metal foil layer 148 covered by hot-melt resin layers 144 and 149. The layers 147 and 149, however, may be dispensed with if desired. Furthermore, a pull-top container cover of the type illustrated in FIGS. 4, 5, 17, 19, 21, 23, 25 or 27 above can be employed with equally good results.

Next, results of retorting tests performed on can-like containers of the present invention will be discussed. The retorting tests were made under the following conditions, wherein a rectangular container as depicted in FIG. 34A was filled with water and covered as illustrated in FIG. 34B.

Retorting Conditions: Temperature: 120° C., Period: 20 min., and Pressure: 2 to 3 kg/cm$^2$.

The material used for the container body was a sheet of aluminum foil laminated with ethylenepropylene block copolymer (CPP-MFR 1.1 and concentration of ethylene=9 wt%) on both sides of the aluminum foil. The thickness of the aluminum foil was 15 μm, the thickness of the outer resin layer was 30 μm, and the thickness of the inner resin layer was 70 μm. The structure of the cover was similar except that the thickness of the aluminum foil was 12 μm, the thickness of the inner resin layer was 70 μm, and the thickness of the outer resin layer was 12 μm.

The results of the retorting tests are presented in Table 13 below:

TABLE 13

| Water Charge (cc) | Tucks | Vertical Wrinkles | Prior Art* |
|---|---|---|---|
| 150 | OK | OK | NG |
| 120 | OK | OK | NG |
| 100 | OK | OK | NG |
| 75 | OK | OK | NG |

OK: No pin holes or separation and retortable;
*Reduced products; and
NG: Pin holes and separation.

As indicated in Table 13, the amount of water charged in the container was varied from full capacity (150 cc) to 50% of full capacity (75 cc) without rupture or puncture of the container, indicating that the container had sufficient strength. As table 13 further indicates, the use of either tucks or vertical wrinkles provides acceptable results, that is, no pin-holes are formed and no separation occurs with a container of the invention.

Figure 35:
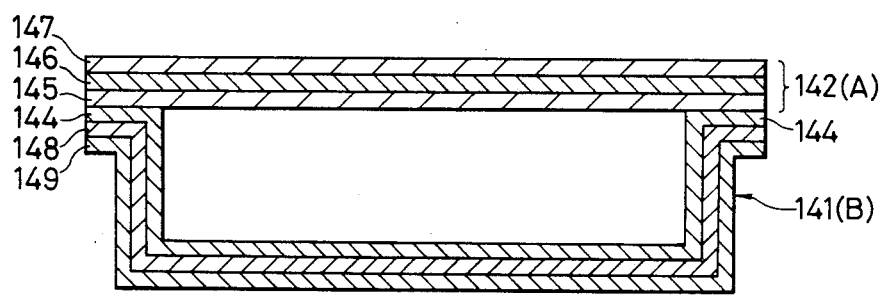
FIGS. 35A–35C illustrate another embodiment of a complete container constructed in accordance with the teachings of the invention.
Figure 35A:
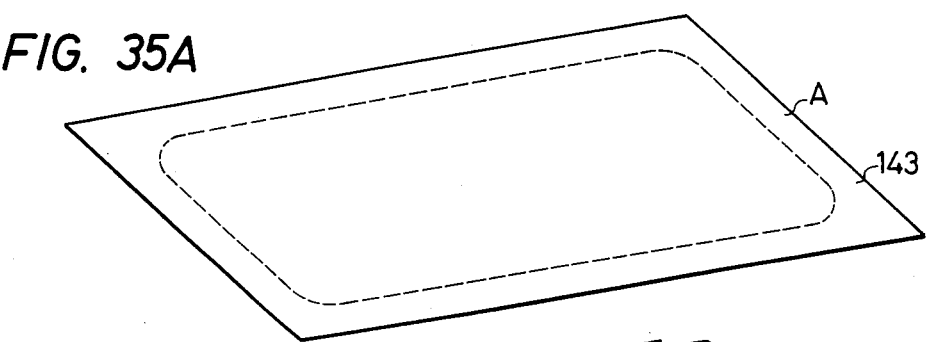
Figure 35B:
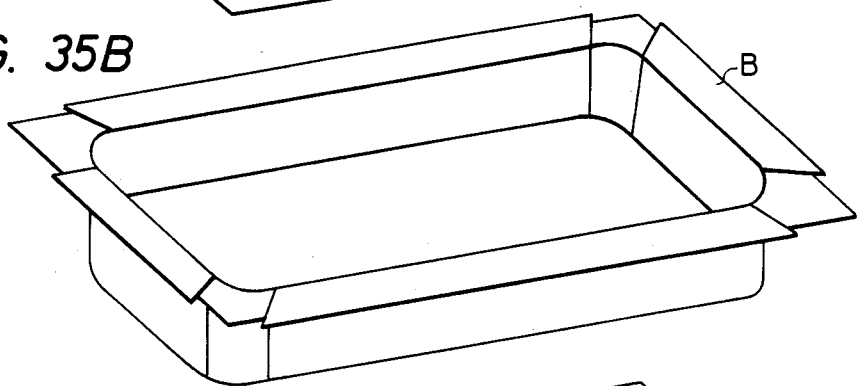
Figure 35C:
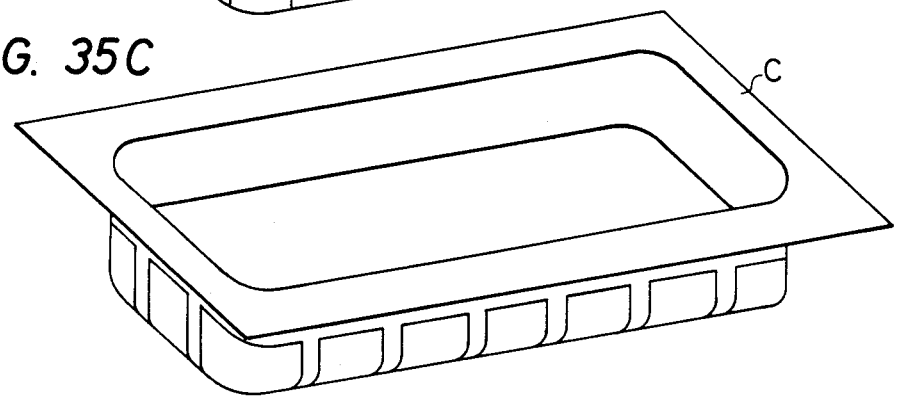
Figure 36:
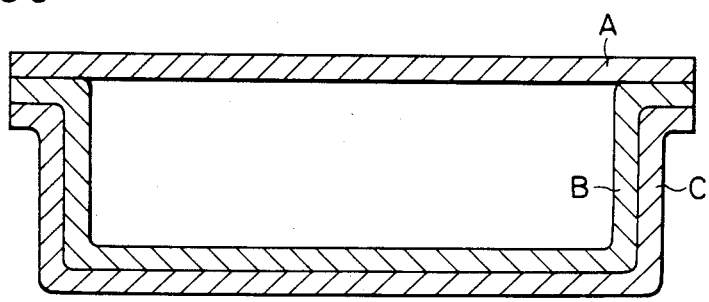
FIG. 36 illustrates a container of the invention having a generally rectangular shape.

Referring now to FIGS. 35A through 35C, a further modification of the present invention will be described. In accordance with this embodiment, a cover A, formed in the same manner as the cover 142, is attached to a receptacle B, constructed in the same manner as the container body 141, and the container B is set in a tray C having the same general configuration as the container body B. FIG. 36 is a longitudinal cross-sectional view showing the assembly of the cover A, container body B and tray C.

The tray can be made from a variety of materials, including plastics, paper or foamed polystyrene. Alternatively, the plastic tray may be formed by injection molding of resin to the outer side of the container body B. It is preferred that the thickness of the tray be sufficient to support the container body and prevent its deformation during transportation and stacking.

As shown in FIG. 36, the container body B is fitted in the tray C in such a manner that the inner side of the latter is adhered to the outer side of the former. For adhering the tray C to the container body B, an adhesive may be used. Otherwise, the inner surface of the tray C may be formed by a hot-melt resin layer and a hot-melt treatment applied to join the two members. Still further, it is possible for the container body B to not be adhered to the tray C, but merely set in abutment with the same. Still further, it is permissible in some embodiments to leave a small clearance between the tray C and the container body B.

To assemble the cover A, the container body B and the tray C, first, the tray is fed to a mold having an inner shape generally conforming to the outer shape of the tray. Next, the container body B is prepared as described above; that is, using the embodiment of either FIG. 28 or that of FIG. 33. Following this, the container body is fixed to the tray by preferably a hot-pressing process. To complete the assembly, the cover is attached, preferably by heat sealing, to the container body B. Of course, prior to the attachment of the cover C, the container body B is charged with food or the like.

A further explanation will be made as to a method of directly injection molding an outer tray by way of example of a cylinder-shaped container.

Figure 37A:
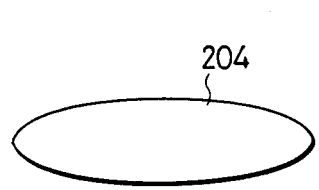
FIGS. 37A to 43 illustrate a method of producing a container of a generally cylindrical shape.
Figure 37B:
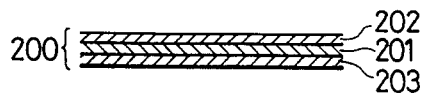
Figure 38:
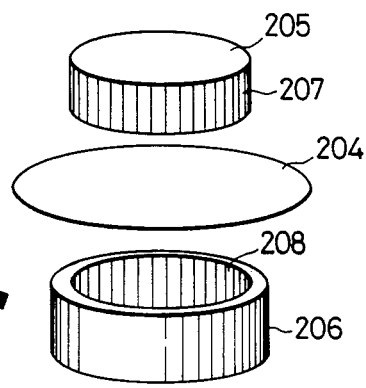
Figure 39:
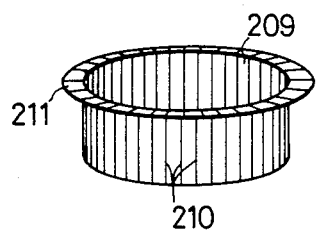
Figure 40:
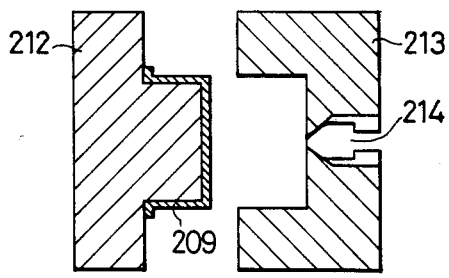
Figure 41:
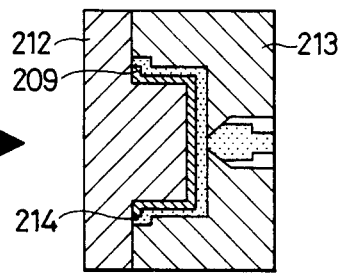
Figure 42:
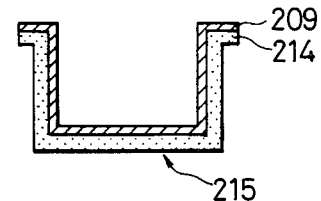

An aluminum-plastic laminate film having an ethylene-propylene copolymer film 202 of 70μ thickness, an aluminum foil 201 of 20μ thickness and a polypropylene film 203 of 30μ thickness as shown in FIG. 37B, is punched out for obtaining a disc 204 as shown in FIG. 37A. The obtained disc 204 of aluminum-plastic laminate film is placed between a male mold 205 and a female mold 206 having vertical grooves 207 and 208, respectively. Then, the male mold 205 is pressed into a hollow portion of the female mold 206, thereby obtaining an aluminum foil-plastic laminate container 209 having a cylindrical shape provided with vertical wrinkles as shown in FIG. 39. The cylindrical aluminum-plastic laminate container 209 is set on a male mold 212 for injection molding as shown in FIG. 40. Then, a female mold 213 is aligned with the male mold 212 on which the container 209 is mounted. Under a suitable pressure, ethylene-propylene block copolymer is injected as shown in FIG. 41. The thickness of the ethylene-propylene block copolymer layer is about 700 microns. Then, the contacting surface of the aluminum-plastic laminate container 209 and the injection molded tray 214 are melt bonded intimately to each other. Thus, an integrated rigid aluminum foil-plastic composite container 215 is obtained as shown in FIG. 42. The vertical wrinkles of the container 209 are smoothed by the resin pressure of the injection molding. Thus, the container has a smoothed inner surface.

Figure 43:
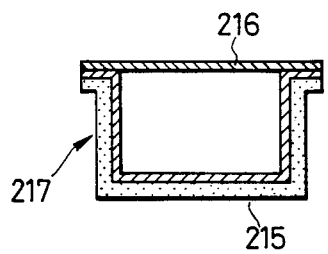

After filling the aluminum foil-plastic composite container 215 with a desired content, a laminate film 216 composed of 12μ polyester (PET)/20μ aluminum foil/70μ easy peel film is placed on the container 215 as shown in FIG. 43. Then, the marginal portions are heat sealed to thereby obtain a completely sealed aluminum-plastic composite container 217. More specifically, the container 209 and the tray 214 are heat bonded at their flanged portions to the cover 216 as shown in FIG. 43. The easy-peel film is made of blended film of ethylene-propylene block copolymer 50% and low density polyethylene 50%.

In accordance with the above-described method, the aluminum-plastic composite container 217 of capacity of 120 cc which was filled with corn soup was retort processed. The following results of ability of preserving the content for a long period were obtained.

| | | Restoring Conditions Temperature: 120° C. Period: 20 min. Pressure: 2 to 3 Kg/cm² | |
|---|---|---|---|
| (a) | Deformation of Container | none | excellent |
| (b) | Pinholes | none | excellent |
| (c) | Separation | none | excellent |
| (d) | Reserving Test (35° C., 3 months, i.e., equivalent to room temperature, two years) | no effect on taste | excellent |
| (e) | Falling Test (Under the condition of 20° C. and −5° C., the container was made fallen from 1 m height to a concrete.) | no crack, no damage (After ten times) | excellent |
| (f) | Heat Seal Strength | 2.3 kg | excellent |
| (g) | Easy-Peel Property | readily opened by a female person | excellent |

With the use of a tray, the can-like container according to the present invention is made yet more rigid, thereby making it possible to use an even thinner metal foil layer in the container body.

Various modifications of the container of the invention can be contemplated within the scope of the present invention. For instance, although the container body is described above having shoulders, these shoulders may be dispensed with. In this case, the cover can be heatsealed directly to the tray. Moreover, in the case that the container is to be vacuumed packed, it is recommended that a small hole be formed in the tray so that the container can be degasified to prevent the deformation thereof during the vacuum-packing process.

Still further, a modification in anticipated in which a resin similar to that of the outer layer of the container is directly injected over the inner surface of the container, whereby the interface between the injected resin and the container surface is smoothed. Still another modification to the cover structure is apparently possible. Namely, referring back to, for example, FIGS. 20 and 21, the easy-peel cover structure may be used for the can-like containers shown in FIGS. 28 to 43.

This completes the description of the preferred embodiments of the invention. Although preferred embodiments have been described, it is believed that numerous modifications and alterations thereto would be apparent to one having ordinary skill in the art without departing from the spirit and scope of the invention.

We claim:

1. A can-like container comprising:
   a container body having side walls and a bottom, said container body being formed of a single multi-layer sheet composed of at least a metal foil layer and a hot-melt resin layer formed on at least one side of said metal foil layer, said metal foil layer having a thickness of no more than 40 m, at least margin portions of said container body containing folds in side wall portions thereof;
   a cover made of a multi-layer sheet compsed of at least a metal foil layer and a hot-melt resin layer formed on one side of said metal foil layer, at least peripheral portions of said hot-melt resin layer of said cover being heat-sealed to said hot-melt resin layer of said container body; and
   a tray injection molded directly to the outer surface of said container body, said tray enclosing at least a lower portion of the outer surface of said container body.

2. The can-like container of claim 1, wherein said container body is substantially rectangular in configuration, and said margin portions in each of the four corner portions of the side wall portions of said container body are formed as two tucks folded towards one another to form said folds.

3. The can-like container of claim 1, wherein said container body is substantially rectangular in configuration, and wherein said margin portions in each of said side wall portions including the four corners of said container body are gathered into vertical wrinkles to form said folds.

4. The can-like container of claim 1, wherein said container body is substantially rectangular in configuration, and wherein said margin portions in the four corners of the side wall portions of said container body are gathered into vertical wrinkles to form said folds.

5. The can-like container of claim 1, wherein said container body is substantially cylindrical in configuration, and wherein said margin portions in each of said side wall portions of said container body are gathered into vertical wrinkles to form said folds.

6. The can-like container of claim 1, wherein said hot-melt resin is a polyolefin.

7. The can-like container of claim 1, wherein said cover comprises an aluminum foil layer having on one side a hot-melt resin layer of polyolefin and on the other side a plastic film.

8. The can-like container of claim 1, wherein said tray is formed of a plastic material.

9. The can-like container of claim 1, wherein said container body has flange-like shoulder portions, and wherein said cover is joined to said shouldered portions.

10. The can-like container of claim 1, wherein said tray comprises flange-like shouldered portions, and wherein said cover is joined to said shouldered portions.

11. The can-like container of claim 1, wherein said tray and said container each comprises flange-like shouldered portions, and wherein said cover is joined to said shouldered portions.

12. The can-like container of claim 1, wherein said container body is substantially cylindrically shaped.

13. The can-like container of claim 12, wherein said tray has a substantially cylindrical shape.

14. The can-like container of claim 1, wherein said cover comprises a second resin layer formed on one side of said metal foil layer opposite said container body, said second resin layer comprising a handle portion.

15. A can-like container comprising:
a container body having side walls and a bottom, said container body being formed of a single multi-layer sheet composed of at least a metal foil layer and a hot-melt resin layer formed on at least one side of said metal foil layer, said metal foil layer having a thickness of no more than 40 μm, at least margin portions of said container body containing folds in side wall portions thereof; and
a tray injection molded directly to the outer surface of said container body, said tray enclosing at least a lower portion of the outer surface of said container body.

16. The can-like container of claim 15 further including a cover adapted to be placed over the open top of said container body.

17. The can-like container of claim 16 wherein said cover comprises a sheet of metal foil.

18. The can-like container of claim 16 wherein said cover is made of a multi-layer sheet composed of at least a metal foil layer and a hot-melt resin layer formed on one side of said metal foil layer, at least peripheral portions of said hot-melt resin layer of said cover being heat-sealed to said hot-melt resin layer of said container body.

* * * * *